(12) United States Patent
Kontothanssis et al.

(10) Patent No.: US 7,970,891 B1
(45) Date of Patent: Jun. 28, 2011

(54) TRACKING LINKS IN WEB BROWSERS

(75) Inventors: Leonidas Kontothanssis, Arlington, MA (US); Scott T. Allen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 11/624,129

(22) Filed: Jan. 17, 2007

(51) Int. Cl.
*G06F 15/173* (2006.01)
*G06Q 30/10* (2006.01)
*H04N 7/10* (2006.01)
*H04N 7/025* (2006.01)

(52) U.S. Cl. .................. 709/224; 705/14.41; 705/14.45; 725/34

(58) Field of Classification Search .................. 709/224; 705/14.41, 14.45; 725/34
See application file for complete search history.

(56) References Cited

U.S. PATENT DOCUMENTS

| | | | | |
|---|---|---|---|---|
| 5,515,270 A | * | 5/1996 | Weinblatt | 705/14 |
| 5,572,643 A | * | 11/1996 | Judson | 709/218 |
| 5,708,780 A | | 1/1998 | Levergood et al. | |
| 5,717,923 A | * | 2/1998 | Dedrick | 707/102 |
| 5,724,521 A | | 3/1998 | Dedrick | |
| 5,727,129 A | * | 3/1998 | Barrett et al. | 706/10 |
| 5,737,619 A | * | 4/1998 | Judson | 715/236 |
| 5,740,549 A | | 4/1998 | Reilly et al. | |
| 5,751,956 A | | 5/1998 | Kirsch | |
| 5,796,952 A | * | 8/1998 | Davis et al. | 709/224 |
| 5,819,285 A | | 10/1998 | Damico et al. | |
| 5,848,397 A | | 12/1998 | Marsh et al. | |
| 5,948,061 A | | 9/1999 | Merriman | |
| 5,960,409 A | | 9/1999 | Wexler | |
| 5,991,740 A | * | 11/1999 | Messer | 705/27 |
| 6,026,368 A | | 2/2000 | Brown et al. | |
| 6,044,376 A | | 3/2000 | Kurtzman, II | |
| 6,055,570 A | * | 4/2000 | Nielsen | 709/224 |
| 6,073,105 A | * | 6/2000 | Sutcliffe et al. | 705/1 |
| 6,078,914 A | | 6/2000 | Redfern | |
| 6,144,944 A | | 11/2000 | Kurtzman, II et al. | |
| 6,167,382 A | | 12/2000 | Sparks et al. | |
| 6,226,752 B1 | * | 5/2001 | Gupta et al. | 726/9 |
| 6,269,361 B1 | | 7/2001 | Davis et al. | |
| 6,286,047 B1 | * | 9/2001 | Ramanathan et al. | 709/224 |
| 6,314,457 B1 | * | 11/2001 | Schena et al. | 709/219 |
| 6,401,075 B1 | * | 6/2002 | Mason et al. | 705/14 |
| 6,718,387 B1 | * | 4/2004 | Gupta et al. | 709/226 |
| 6,763,468 B2 | * | 7/2004 | Gupta et al. | 726/2 |

(Continued)

FOREIGN PATENT DOCUMENTS

WO    WO 97/21183    6/1997

OTHER PUBLICATIONS

U.S. Appl. No. 95/001,073, filed Sep. 30, 2004, Stone et al.

(Continued)

*Primary Examiner* — Tonia L Dollinger
*Assistant Examiner* — Daniel C Murray
(74) *Attorney, Agent, or Firm* — Fish & Richardson P.C.

(57) ABSTRACT

The present disclosure includes a system and method for tracking links displayed in Web browsers. In some implementations, a method includes receiving a hostname operable to identify an action and an instance of a link displayed through a Web browser. The hostname is unique for a period of time. The one or more actions associated with the displayed link are tracked.

38 Claims, 11 Drawing Sheets

U.S. PATENT DOCUMENTS

| | | | |
|---|---|---|---|
| 6,769,019 B2* | 7/2004 | Ferguson | 709/219 |
| 6,772,200 B1* | 8/2004 | Bakshi et al. | 709/217 |
| 6,789,110 B1* | 9/2004 | Short et al. | 709/221 |
| 6,895,430 B1* | 5/2005 | Schneider | 709/217 |
| 6,985,882 B1 | 1/2006 | Del Sesto | |
| 7,003,734 B1* | 2/2006 | Gardner et al. | 715/808 |
| 7,039,599 B2 | 5/2006 | Merriman | |
| 7,076,443 B1* | 7/2006 | Emens et al. | 705/14 |
| 7,136,875 B2 | 11/2006 | Anderson et al. | |
| 7,240,025 B2* | 7/2007 | Stone et al. | 705/26 |
| 7,444,371 B2* | 10/2008 | Douglis et al. | 709/203 |
| 7,478,148 B2* | 1/2009 | Neerdaels | 709/223 |
| 7,490,135 B2* | 2/2009 | Klug et al. | 709/217 |
| 7,493,553 B1* | 2/2009 | Vora et al. | 715/205 |
| 7,512,603 B1* | 3/2009 | Veteska et al. | 707/6 |
| 2001/0037469 A1* | 11/2001 | Gupta et al. | 713/202 |
| 2002/0065882 A1* | 5/2002 | Arkin et al. | 709/204 |
| 2002/0066097 A1* | 5/2002 | Hattori et al. | 725/34 |
| 2002/0072971 A1* | 6/2002 | DeBusk et al. | 705/14 |
| 2002/0161648 A1* | 10/2002 | Mason et al. | 705/14 |
| 2002/0178232 A1* | 11/2002 | Ferguson | 709/217 |
| 2003/0135509 A1* | 7/2003 | Davis et al. | 707/100 |
| 2003/0236701 A1* | 12/2003 | Rowney et al. | 705/14 |
| 2004/0017798 A1* | 1/2004 | Hurtta et al. | 370/352 |
| 2004/0103026 A1* | 5/2004 | White | 705/14 |
| 2004/0249939 A1* | 12/2004 | Amini et al. | 709/225 |
| 2006/0080166 A1* | 4/2006 | Takahashi | 705/14 |
| 2006/0095507 A1 | 5/2006 | Watson | |
| 2006/0173974 A1* | 8/2006 | Tang | 709/217 |
| 2006/0178934 A1* | 8/2006 | Besmertinik et al. | 705/14 |
| 2007/0124288 A1* | 5/2007 | Swanson et al. | 707/3 |
| 2007/0124290 A1* | 5/2007 | Swanson et al. | 707/3 |
| 2007/0265858 A1* | 11/2007 | Pansari et al. | 705/1 |
| 2008/0005342 A1* | 1/2008 | Schneider | 709/230 |
| 2008/0208682 A1* | 8/2008 | Chandley et al. | 705/14 |

OTHER PUBLICATIONS

U.S. Appl. No. 95/001,061, filed Sep. 3, 2002, Stone et al.
U.S. Appl. No. 95/001,069, filed Jul. 11, 2002, Dean et al.
U.S. Appl. No. 95/001,068, filed Dec. 7, 2002, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, U.S. Appl. No. 95/001,073.
Request for Reexamination of U.S. Patent No. 6,446,045 B1, U.S. Appl. No. 95/001,061.
Request for Reexamination of U.S. Patent No. 7,249,059 B2, U.S. Appl. No. 95/001,069.
Request for Reexamination of U.S. Patent No. 6,829,587 B2, U.S. Appl. No. 95/001,068.
"Google's Preliminary Invalidity Contentions," *Web Tracking Solutions LLC et al. v. Google Inc.*, dated Jun. 26, 2009, Civil Action No. 1:08-CV-03139, 12 pages.
Link Marketing, Z00022-Z00027, SD 027093-SD 027098, May 28, 1995, 6 pages.
Link Marketing, LLP, Z00020-Z00021, SD 027091-SD 027092, May 11, 1995, 2 pages.
David Zinman et al., "LinkMarket Business Plan Prepared for: Charles Holloway, Dennis Rohan for S356 High-tech Entrepreneurship", Z00033-Z00056, SD 027104-SD027127, Jun. 6, 1995, 24 pages.
Electronic mail from Jason Strober to Ron Kovas, Karen Johnson and David Zinman dated Tuesday Nov. 7, 1995, Subject: Web site pricing draft, Z00108, SD 027176, 1 page.
Electronic mail from Jason Strober to Anne Roskey, cc: Michael Wang, David Zinman, Karen Johnson, Ron Kovas and Dan Stoller dated Tuesday Nov. 21, 1995, Subject: Microsoft ads through FocaLink, Z00126, SD 027194, 1 page.
Electronic mail from Jennifer Ratner to wigley@utne.com, cc: David Zinman dated Tuesday Dec. 5, 1995, Subject: November Report, Z00141-Z00146, SD 027206-SD 027211, 6 pages.
Electronic mail from Jennifer Ratner to wigley@utne.com, cc: David Zinman dated Tuesday Dec. 5, 1995, Subject: Saturn reports, Z00134-Z00140, SD 027199-SD 027205, 7 pages.
Electronic mail from Michael Wang to Jason Strober, cc: Michael Wang dated Tuesday Dec. 12, 1995, Subject: Intel Report Nov. 27, 1995-Dec. 3, 1995, JS00311-JS00325, SD 027636-SD 027650, 15 pages.
Electronic mail from Michael Wang to Jason Strober, cc: Michael Wang dated Tuesday Dec. 12, 1995, Subject: Intel Report Dec. 4-10, 1995, JS00298-JS00310, SD 0276623-SD 027635, 13 pages.
Electronic mail from Roger Follis to David Zinman, Jason Strober and Karen Johnson dated Feb. 5, 1996, Subject: FYI, Z00184-Z00185, SD 027249-SD 027250, 2 pages.
Electronic mail from Jason Strober to Jennifer Ratner, cc: Ron Kovas, David Zinman and Michael Wang dated Monday Nov. 13, 1995, Subject: Proposal to Intel, Z00111-Z00114, SD027179-SD 027182, 4 pages.
Declaration Under 37 C.F.R. 1.132 of Dwight A. Merriman for Reissue U.S. Appl. No. 09/577,798, dated Feb. 9, 2001, 10 pages.
"Exhibit A—Chart A-1: FocaLink," Jun. 26, 2009, 60 pages.
Focalink Communications, Welcome to Focalink!, Company information and product overview, Mar. 14, 1996, 24 pages.

* cited by examiner

112

```
<html>
<head>
.
.
.
.
.
.
310 { <a href="http://ad21.cars.com.example.com">
    Click here for new cars! </a>
.
.
.
.
.
.
</html>
```

FIG. 5

TRACKING LINKS IN WEB BROWSERS

TECHNICAL FIELD

This invention relates to tracking links.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. These service providers may track users' interactions with such services to determine associated metrics and/or modify these services based on such interactions to further enhance the user experience.

SUMMARY

The present disclosure includes a system and method for tracking links displayed in Web browsers. In some implementations, a method includes receiving a hostname operable to identify an action and an instance of a link displayed through a Web browser. The hostname is unique for a period of time. The one or more actions associated with the displayed link are tracked.

The details of one or more implementations of the invention are set forth in the accompanying drawings and the description below. Other features, objects, and advantages of the invention will be apparent from the description and drawings, and from the claims.

DESCRIPTION OF DRAWINGS

FIGS. 5 and 6 are example Web pages illustrating HTML code for tracking actions associated with graphical elements in the tracking system of FIG. 1;

DETAILED DESCRIPTION

Figure 1:
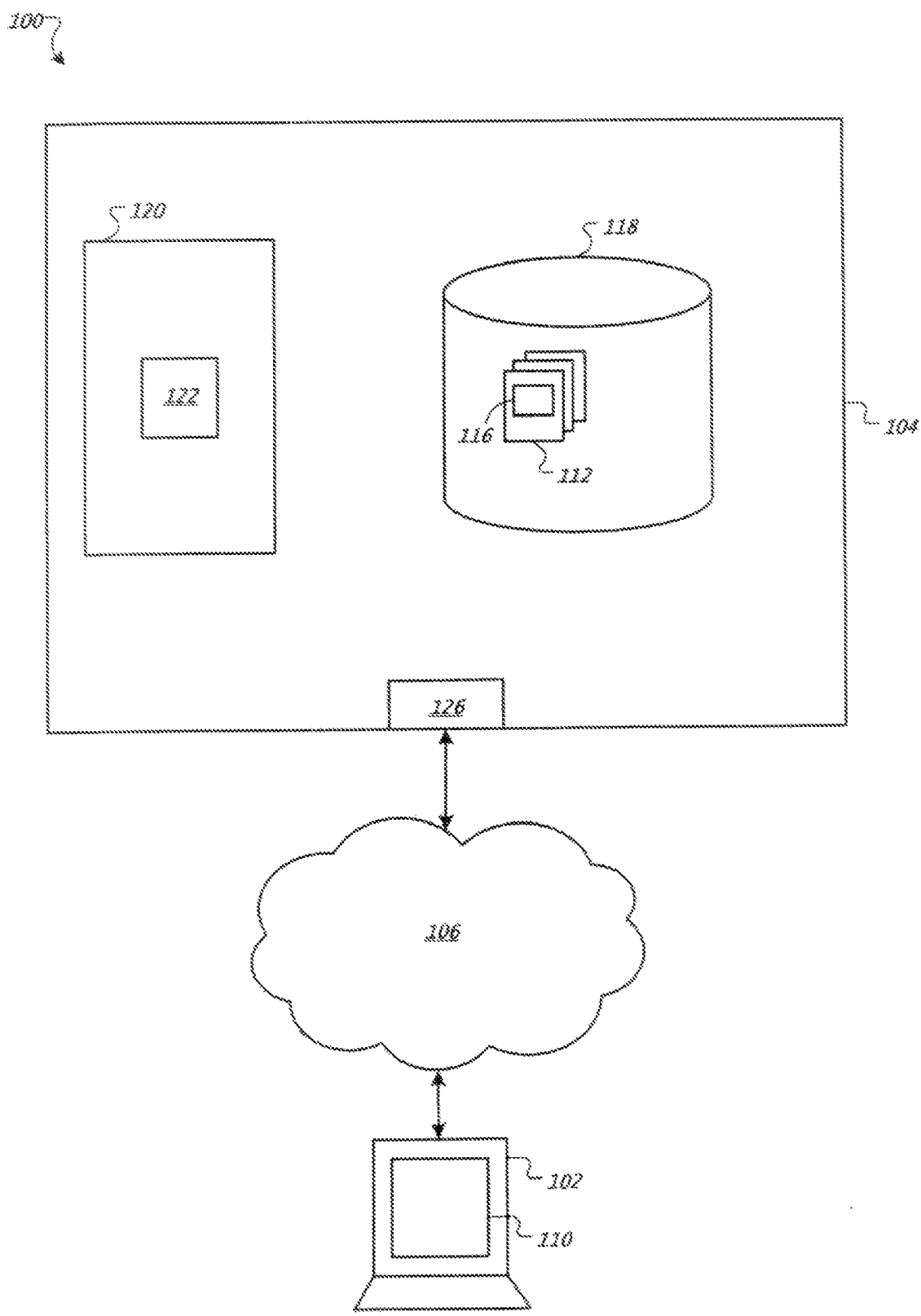
FIG. 1 is a block diagram illustrating an example system for providing trackable links in accordance with some implementations of the present disclosure.

FIG. 1 illustrates an example system 100 for providing trackable links embedded in Web pages. A trackable link may include an image (e.g., a banner advertisement), text (e.g., a hyperlink), and/or other displayed elements that a user may interact with through a device (e.g., computer, mobile phone, PDA). For example, the system 100 may include links in Web pages to track actions (e.g., click throughs) directing a user to a third-party Web page. In other words, the system 100 may use links to track actions directing a user to an independent server. In tracking actions, the system 100 may generate User Datagram Protocol (UDP) packets. In this case, the system 100 may transmit tracking information in a single data packet to a tracking server (see FIG. 4). Tracking information may identify or include information that identifies one or more of the following: a link, a specific instance of a link, a user, a client device, a date, a time, an action (e.g., clicks, click throughs, viewing times), history of actions (e.g., previous sites visited/action taken), location, client behavior (e.g., mouse movements using mouseover/mouseout, time between presentation and click), and/or other information associated with a trackable link and/or user. In some implementations, the system 100 may convey tracking information by generating an identifier that can be associated with a specific instance of a link. Such identifies may be substantially unique or unique for a period of time (e.g., five minutes, 30 minutes, 1 hour, a day). In some implementations, the system 100 may transmit tracking information in accordance with one or more of the following: in a single data packet, using UDP, independent of the Web browser initiating the tracking process, and/or as a substantially unique string. In performing one or more of these implementations, the system 100 may eliminate, minimize, or otherwise decrease latency in transmitting tracking information and/or unreliability as compared with other tracking systems.

For example, the system 100 may transmit tracking information using UDP in the Domain Name System (DNS). DNS is conventionally used to translate a domain name, i.e., a name used as part of a Website or other Uniform Resource Locator (URL), to an Internet Protocol (IP) address associated with that name. In resolving domain names, DNS often transmits a single UDP data packet including a DNS lookup request independent of the Web browser that initiates the request. For example, the system 100 may generate a DNS lookup request in response to a user clicking on a link displayed through a Web browser and process and transmit the DNS lookup request independent of the Web browser. As a result of transmitting the tracking information independent of the Web browser, the system 100 may enhance, maximize, or otherwise increase reliability in tracking actions. In some implementations, the system 100 includes tracking information in DNS lookup requests as hostnames. For instance, the system 100 may generate a hostname that is operable to identify tracking information associated with a specific instance of a link. Though, DNS includes caching, so to substantially avoid caching from interfering with tracking actions, the system 100 may generate hostnames that are substantially unique and/or unique within a period of time (e.g., thirty minutes, an hour, a day).

At a high level, the system 100, in some implementations, includes a client 102 and a content server 104 coupled using through a network 106. In this implementation, the client 102 includes a Graphical User Interface (GUI) 110 for displaying Web pages 112 provided by the content provider 104. The content provider 104 includes a memory 118 and a processor 120. The memory 118 locally stores the Web pages 112, and the processor 120 includes a request engine 116 for processing request received from the network 106 (e.g., client 102). Turning to a high level description of the operation of the illustrated tracking system 100, the client 102 transmits a request to the content provider 104 for a Web page 112 for display through the GUI 110. In some implementations, the request may identify a specific Web page (e.g., advertiser's Web page). In some implementations, the request may include a search request for third-party Web pages associated with specified search criteria. In some implementations, the request is for a dynamically generated Web page. For example, the user may request content and, in response to the request, the content provider 104 may dynamically generate a Web page based, at least in part, on suitable parameters (e.g., previous user selections). In the case of user selections, the user may request news content and the content provider 104 may dynamically generate a Web page based, at least in part, on previous news articles selected by the user. In response to at least the request, the content provider 104 identifies the Web page 112 and transmits the identified Web page 112 to the client 102 through the network 106 for display through the GUI 110. As mentioned above, the Web page 112 includes a link 116 for tracking actions associated with the link 116 using DNS.

As for a more detailed description of the illustrated elements, the client 102 includes or executes at least GUI 110 and comprises an electronic device (e.g., a computing device) operable to receive, transmit, process and store data associated with the system 100. While not illustrated, the system 100 may include any number of clients 102 communicably coupled to the content provider 104. Further, "client 102" and "user" may be used interchangeably as appropriate without departing from the scope of this disclosure. Moreover, for ease of illustration, the client 102 is described in terms of being used by one user, but many users may use one device (e.g., client 102) or that one user may use multiple devices without departing from the scope of this disclosure.

As used in this disclosure, the client 102 is any person, department, organization, small business, enterprise, or any other entity that may use or request others to use the system 100. The client 102 is intended to encompass a personal computer, touch screen terminal, workstation, network computer, kiosk, wireless data port, smart phone, personal data assistant (PDA), cellular device, one or more processors within these or other devices, or any other suitable electronic device used by a user viewing Web pages 112 from the content provider 104. For example, the client 102 may be a PDA operable to wirelessly connect with an external or unsecured network. In another example, the client 102 may comprise a laptop that includes an input device, such as a keypad, touch screen, mouse, or other device that can accept information, and an output device that conveys information from the content provider 104 (e.g., advertisements, search results), including digital data, visual information, or the GUI 110. Both the input device and output device may include fixed or removable storage media such as a magnetic computer disk, CD-ROM, or other suitable media to both receive input from and provide output to users of the client 102 through the display, namely the client portion of the GUI 110.

The GUI 110 comprises a graphical user interface operable to allow the user of the client 102 to interface with at least a portion of the system 100 for any suitable purpose, such as viewing Web pages 112 that may include advertisements, search results, hyperlinks to third-party Web sites, and other links. Generally, the GUI 110 provides the particular user with an efficient and user-friendly presentation of data provided by or communicated within the system 100. The GUI 110 may comprise a plurality of customizable frames or views having interactive fields, pull-down lists, and/or buttons operated by the user. For example, the GUI 110 is operable to display certain links 116 in a user-friendly form based on the user context and the displayed data. The GUI 110 may also present a plurality of portals or dashboards. It should be understood that the term graphical user interface may be used in the singular or in the plural to describe one or more graphical user interfaces and each of the displays of a particular graphical user interface. The GUI 110 contemplates any graphical user interface, such as a generic web browser or touch screen, that processes information in the system 100 and presents the results to the user. The content provider 104 can accept data from the client 102 using, for example, the web browser (e.g., Microsoft Internet Explorer or Mozilla Firefox) and return the appropriate responses (e.g., HTML or XML) to the browser using the network 106.

The content provider 104 comprises an electronic device operable to receive, transmit, process and store data associated with the system 100. The system 100 can be implemented using devices or computers other than servers, as well as a server pool. Indeed, the content provider 104 may be any computer or processing device such as, for example, a blade server, general-purpose personal computer (PC), Macintosh, workstation, Unix-based computer, or any other suitable device. In other words, the system 100 may include computers other than general purpose computers as well as computers without conventional operating systems. In computing device implementations, the content provider 104 may be adapted to execute any operating system including Linux, UNIX, Windows Server, or any other suitable operating system. In certain implementations, the content provider 104 may also include or be communicably coupled with a web server and/or a DNS server (see FIG. 4).

As mentioned above, the content provider 104, in this implementation, includes the memory 118 and the processor 120. The memory 118 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 118 includes the Web pages 112. Local memory 118 may also include any other appropriate data such as VPN applications or services, firewall policies, a security or access log, print or other reporting files, HTML files or templates, data classes or object interfaces, child software applications or sub-systems, and others.

The Web pages 112 comprise displays through which information can be presented to users of the clients 102. In some implementations, the Web pages 112 includes search results displayed through GUI 110. In general, the Web pages 112 include any machine readable and machine storable work product that may generate or be used to generate a display through the GUI 110. The Web pages 112 may be a file, a combination of files, dynamically generated by the content provider 104 based on suitable parameters (e.g., user profile, user demographics, previous selections of the user), one or more files with embedded links to other files, etc. The Web pages 112 may include text, audio, image, video, animation, and other attributes. In short, the Web pages 112 comprise any source code or object code for presenting one or more trackable links 116. In some implementations, the trackable link 116 can be a hyperlink identifying a third-party Web page associated search criteria (see FIG. 2). For example, the trackable link 116 can be an ad image for presenting information associated with, for example, a product and/or service (see FIG. 3).

The links 116 include any parameters, pointers, variables, algorithms, instructions, rules, files, links, source or object code, objects, directives, and/or other data for easily providing trackable secondary content (e.g., images, text) for display through the GUI 110. In general, the links 116 may perform two functions: (1) presenting information to a user of the client 102; and (2) tracking actions associated with the presented information. As for the presented information, such links 116 may include (among other things) primary content, secondary content, and/or sponsored content. For example, each link 116 may be a text element, a graphics element, a multimedia element, and/or any other graphical or display element. In a more specific example, the link 116 may include a static image in any suitable format such as JPG, GIF, and PNG. As for tracking actions, the link 116 may comprise source or executable code that tracks action actions associated with the presented content. For example, the link 116 may generate a UDP packet including tracking information in response to a user action. In general, the link 116 may perform one or more of the following tracking functions: generate tracking information in response to a user action, initiate transmission of a UDP packet including tracking information, initiate a DNS resolution request including tracking information, and/or pass tracking information to an element that operates independent of the Web browser displaying the link 116.

As for tracking information, the link 116 may generate tracking information based on one or more parameters. For example, the link 116 may generate tracking information identifying or operable to identify a specific instance of the link 116, a user action, and/or a user. In some implementations, the link 116 generates a substantially unique string to facilitate the association of the tracking information to a specific instance of the link 116. In the case that the system 100 uses DNS, the link 116 may generate a hostname based on one or more appropriate parameters (e.g., an action, an instance, a user). In this case, the link 116 may generate a unique hostname or a unique hostname for a period of time. For example, the link 116 may generate a unique hostname using a combination of encryption and signing (for example using a combination of 3des and md5). In some implementations, the link 116 may combine an action identifier and a content identifier with other information to generate a hostname. In this case, the link 116 may generate the following hostname <action identifier>.<content identifier>.tracking.example.com, which may direct a DNS lookup request to special tracking servers associated with the host (discussed in more detail with respect to FIG. 4). In some implementations, the link 116 may generate a hostname that merely identifies a specific instance of the link 116 such as an ad identifier. In this case, the link 116 may generate the following hostname <ad identifier>.tracking.example.com. The generated hostname may implicitly identify the associated action such as a click through. As mentioned above, a substantially unique hostname may eliminate, minimize or otherwise decrease interference from DNS caching. Alternatively or in combination, the link 116 may initiate a DNS lookup request with a TTL of 0. Even though some cache DNS servers ignore TTLs that are 5 minutes or less, generating a TTL of 0 will may guarantee that DNS servers that obey the DNS specification will not have their cache populated with a large number of unique hostnames generated by the system 100.

In some implementations, the link 116 may execute, include or otherwise identify one or more of the following: an event handler (e.g., onmousedown, onclick), an XmlHttpRequest, a hidden iframe, a Flash object, and/or other suitable source code or object code operable to generate or initiate the generation of a UDP packet. For example, the link 116 may execute a javascript to initiate a DNS lookup request using UDP (see FIG. 4). In some examples, the link 116 may execute a Flash object that generates and transmits a single UDP packet including tracking information. In these examples, the elements identified by the link 116 may execute independent of the Web browser that displays the link 116. In the DNS example, the javascript may pass tracking information to a local DNS resolver, which operates independent of the associated Web browser. In the Flash-object example, the link 116 may pass tracking information to the object and the Flash object generates and transmits a single UDP packet using the tracking information. As mentioned above, having the link 116 identify an element independent of the associated Web browser may, in some implementations, increase the reliability of the tracking processes. Alternatively or in combination, the links 116, in the DNS example, may initiate a DNS lookup request using Transmission Control Protocol (TCP).

Processor 120 executes instructions and manipulates data to perform operations of content provider 104. Although FIG. 1 illustrates a single processor 120 in the content provider 104, multiple processors 120 may be used according to particular needs, and reference to processor 120 is meant to include multiple processors 120 where applicable. In the illustrated implementation, the processor 120 executes the request engine 122. The request engine 122 can be of the form of software, for example, operable to provide the Web pages 122 to the client 102 in accordance with a request. As mentioned above, the request may include a search request or a request for a specific Web page 112. In some implementations, the request engine 112 dynamically generates a Web page 112 based on one or more parameters. In this case, the request engine 112 may identify one or more parameters associated with the user, the client 102, and/or other information associated with the system 100. For example, the request engine 122 may dynamically generate a Web page 112 based on previous user actions such as previous selections of the user. The previous selections may be identified, at least in part, on types of content, keywords associated with previous content, actions associated with the previously selected content (e.g., viewing time) and/or other parameters. Discussed in more detail with respect to FIG. 3, the request engine 112 can select the selection criteria 114 in response to a request for a Web page 114 from the content provider 102. The request engine 122 may identify usage guidelines in the selection criteria 114 and based, at least in part, on the usage guidelines identify a link 116 for embedding in the Web page 112. After identifying the link 116, the request engine 122 may transmit Web page 112 including the embedded link 116 to the client 102 using network 106. In some implementations, the request engine 122 may transmit to a tracking server (See FIG. 4) information associated with the request (e.g., link identifier, user, time, date). While illustrated as a module of the content provider 104, the request engine 122 may be integrated into another network device that manages ad requests for the network 106.

Regardless of the particular implementation, "software" may include software, firmware, wired or programmed hardware, or any combination thereof as appropriate. Indeed, element engine 126 may be written or described in any appropriate computer language including C, C++, Java, J#, Visual Basic, assembler, Perl, PHP, as well as others. It will be understood that while the request engine 122 and the selection engine 124 are illustrated in FIG. 1 as including individual modules, the request engine 122 and/or the selection engine 124 may include numerous other sub-modules or may instead be a single multi-tasked module that implements the various features and functionality through various objects, methods, or other processes. Further, while illustrated as internal to the content provider 104, one or more processes associated with the request engine 122 may be stored, referenced, or executed remotely. Moreover, the request engine 122 may be a child or sub-module of another software module or enterprise application (not illustrated) without departing from the scope of this disclosure.

The content provider 104 may also include an interface 126 for communicating with other systems, such as the client 102, over the network 106 in a client-server or other distributed environment. In certain implementations, the content provider 104 receives data from internal or external senders through the interface 126 for storage in local memory 118 and/or processing by processor 120. Generally, the interface 126 comprises logic encoded in software and/or hardware in a suitable combination and operable to communicate with the network 106. More specifically, the interface 126 may comprise software supporting one or more communications protocols associated with communications over the network 106 or hardware operable to communicate physical signals.

The network 106 facilitates wireless or wireline communication between the content provider 104 and any other local or remote computer, such as the client 102. The network 106 may be all or a portion of an enterprise or secured network. While illustrated as single network, the network 106 may be a continuous network logically divided into various sub-nets or virtual networks without departing from the scope of this disclosure, so long as at least portion of the network 106 may facilitate communications of the links 116 between the content provider 104 and the client 102. In some implementations, the network 106 encompasses any internal or external network, networks, sub-network, or combination thereof operable to facilitate communications between various components in the system 100. The network 106 may communicate, for example, Internet Protocol (IP) packets, Frame Relay frames, Asynchronous Transfer Mode (ATM) cells, voice, video, data, and other suitable information between network addresses. The network 106 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the client 102 transmits a request to the content provider 104 for one or more Web pages 112. In some implementations, the request may include a request for a list of third-party Web pages associated with one or more keywords. In some implementations, the request is a request for a specific Web page. The request engine 122 identifies the Web page 112 based, at least in part, on the request. The Web page 122 includes a trackable link 116. In some implementations, the trackable link 116 is a hyperlink configured to initiate a DNS lookup request including tracking information in response to a user of the client clicking on the link 116. In some implementations, the trackable link 116 is an ad image configured to initiate a DNS lookup request including tracking information in response to a click through. After identifying the Web page 112 including the trackable link 116, the selection engine 122 transmits the identified Web page 112 to the client 102 for display through GUI 110.

Figure 2:
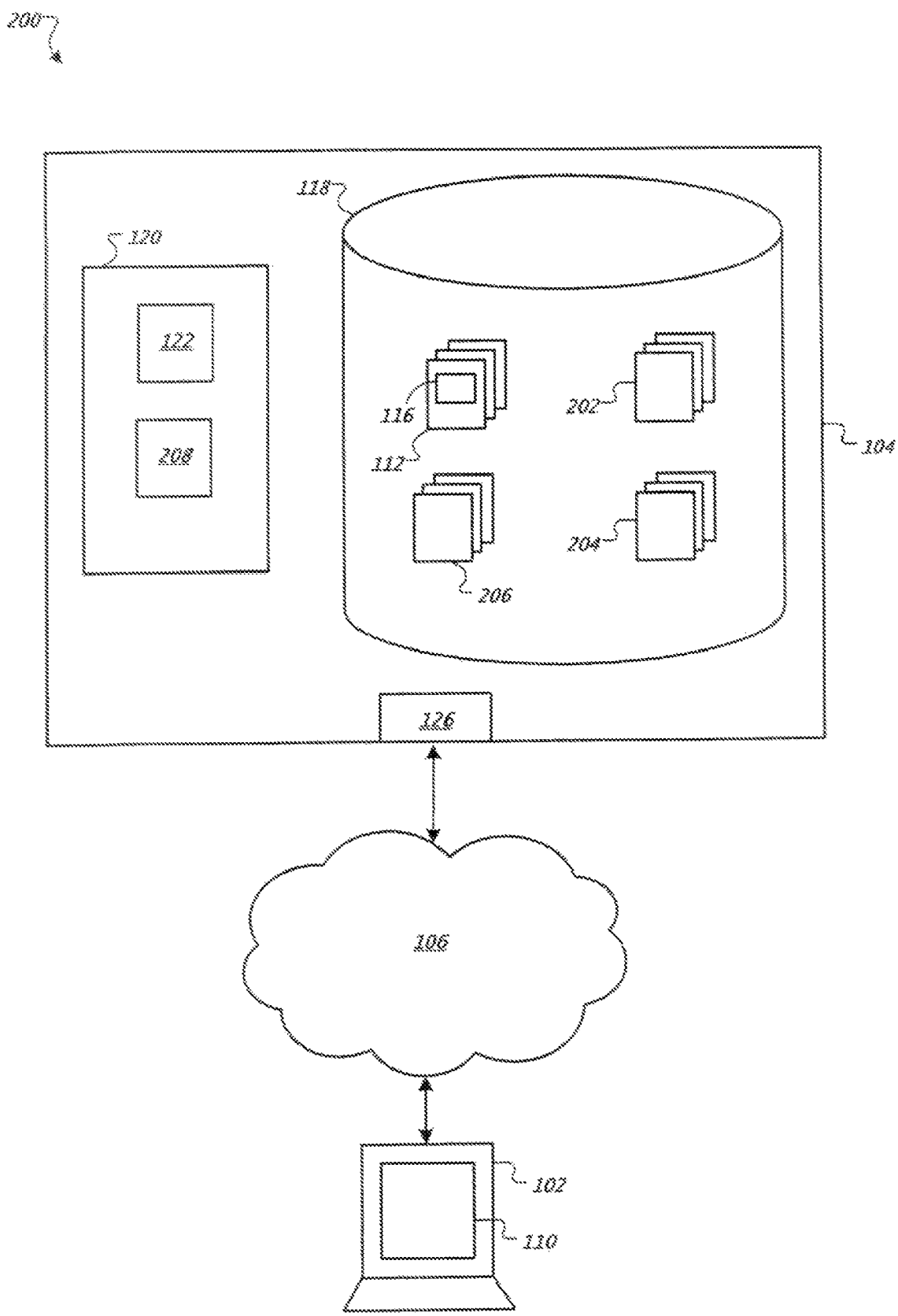
FIG. 2 is a block diagram illustrating an example system including trackable hyperlinks in accordance with some implementations of the present disclosure.

FIG. 2 illustrates a system 200 for providing trackable hyperlinks 116 using UDP. In the illustrated implementation, the content server 104 comprises a search engine and will be referred to as the search engine 104 in describing system 200. In general, the search engine 104 receives a request to identify Web sites in accordance with specified search criteria and transmits a Web page 112 including one or more hyperlinks 116 that identify such Web sites. In some implementations, the hyperlinks 116 can generate and/or include directives for generating a single UDP packet that including information for tracking actions associated with the hyperlink 116. For example, the user of client 102 may click a hyperlink 116 presented through GUI 110, and in response to at least the click, the hyperlink 116 may generate a single UDP data packet (e.g., a DNS lookup request) for tracking the user's selection of the third-party Web site.

In addition to the elements described with respect to FIG. 1, the memory 118 includes search indexes 202 for associating search criteria with Web sites, attribute profiles 204 for defining attributes (e.g., color, font, icons) of hyperlinks 116, and selection criteria 206 for associating a hyperlink 116 with one or more attribute profiles 204. The processor 120 includes a selection engine 208 for selecting an attribute profile 204 using the selection criteria 206 and/or updating the selection criteria 206 in accordance with information received from the network 106. As for high-level description of the operation of the system 200, the client 102 transmits a search request to the search engine 104 to identify Web sites using certain search criteria. The request engine 122 identifies third-party Web sites using one or more search indexes 202 and the search request. The selection engine 208 identifies one or more attribute profiles 204 based, at least in part, on the identified Web sites and/or the request. Using the attribute profiles, the request engine 122 generates the Web page 112 including the hyperlinks 116 to the third-party Web sites using the identified attribute profile 204 and search indexes 202. The request engine 122 transmits the Web page 112 including the hyperlinks 116 to the client 102 for displaying the hyperlinks 116 through the GUI 110. In addition, the selection engine 208 may receive information and/or a request to update the selection criteria 206 from the network 106 and, in accordance with the request, update one or more selection criteria 206.

Turning to a more detailed description, the search index 202 includes any parameters, variables, policies, algorithms, instructions, settings, or rules for mapping one or more search criteria to a Web site. For example, the search index 202 may include a table that maps keywords to specific Web sites. In addition, the search index 202 may include one or more of the following data structures: suffix trees, tries, inverted indices, citation indices, Ngram indices, terminal document matrices, and/or other structures or parameters for mapping criteria to one or more Web sites. Each search index 202 may be associated with a specific criterion or multiple criteria and may be associated with a single search index 202. The index 202 may be stored in one or more tables stored in a relational database described in terms of SQL statements or other scripts. In other implementations, the indexes 202 may be formatted, stored, or defined as various data structures in text files, XML documents, VSAM files, flat files, Btrieve files, CSV files, internal variables, or one or more libraries. In short, the indexes 202 may comprise one table or file or a plurality of tables or files stored on one computer or across a plurality of computers in any appropriate format. Moreover, the indexes 202 may be local or remote without departing from the scope of this disclosure and store any type of appropriate data.

The attribute profile 204 may include any parameters, variables, policies, algorithms, instructions, settings, or rules for defining settings for the one or more attributes of the hyperlink 116. For example, the attribute profile 204 may define font types, text color, background color, background texture, icons, audio volume and/or pitch, animation colors and/or motion rate, and/or other settings for the attributes of the hyperlink 116. Of course, the above parameters are for example purposes and may not reflect some implementations within the scope of this disclosure. The profiles 204 may be associated with a group of hyperlinks 116 or a single hyperlink 116. In some implementations, the hyperlink 116 is associated with different attribute profiles 204 such that each profile 204 presents the associated hyperlink 116 differently. For example, two different profiles 204, when applied to the hyperlink 116, may present the hyperlink 116 with two different sets of attributes. The profiles 204 may be stored in one or more tables stored in a relational database described in terms of SQL statements or scripts. In other implementations, the profiles 204 may be formatted, stored, or defined as various data structures in text files, XML documents, VSAM files, flat files, Btrieve files, CSV files, internal variables, or one or more libraries. In short, the profiles 204 may comprise one table or file or a plurality of tables or files stored on one computer or across a plurality of computers in any appropriate format. Moreover, profiles 204 may be local or remote without departing from the scope of this disclosure and store any type of appropriate data.

The selection criteria 206 may include any parameters, variables, algorithms, instructions, rules, objects or other directives for selecting attribute profiles 204 to apply to hyperlinks 116. For example, the selection criteria 206 may identify current usage guidelines for the attribute profiles 204. These guidelines may merely identify a simple rotation between the profiles 204 and/or a more complex system for selecting the attribute profiles 204. For example, the selection criteria 206 may include mathematical and/or logical expressions for selecting the attribute profile 204 based on any appropriate parameter. Alternatively or in addition to a set guideline, the selection criteria 206 may include different criteria based, at least in part, on other aspects such as periods of time, user information, content of the Web site associated with a hyperlink 116, and/or others. For example, the selection criteria 206 may include criteria for selecting the attribute profile 204 (e.g., green and red text) during specified holidays (e.g., Christmas) and/or criteria for different aspects of a user (e.g., location, native language, demographics). In short, the selection criteria 206 may include any appropriate information for selecting attribute profiles 204 to apply to one or more hyperlinks 116.

As mentioned above, the processor includes the request engine 122 and the selection engine 208. The request engine 122 can be any suitable software that determines search results based, at least in part, on a search request. For example, the request engine 122 may identify one or more Web sites by comparing search criteria to one or more search indexes 202. In general, the request engine 122 may perform one or more of the following functions: receive a search request including one or more criteria, identify the search criteria using the search request, identify one or more search indexes 202 associated with the search criteria, identify one or more Web sites using the search indexes 202 and the search criteria, and/or generate a Web page 112 including one or more hyperlinks 116 identifying the search results. In comparing the search criteria to the one or more search indexes 202, the request engine 122 may determine associations between keywords and one or more Web sites. Alternatively or in addition, the request engine 122 may compare search criteria to any suitable data structure (e.g., search tree). In addition, the request engine 122 may arrange or otherwise rank identified Web sites in accordance to relevance to the search criteria and/or other parameters (e.g., selection frequency).

The selection engine 208 can be any suitable software, for example, operable to identify attribute profiles 204 for hyperlinks 116. For example, the selection engine 208 may initially identify selection criteria 206 based, at least in part, on Web sites identified by the request engine 122 and, using information associated with these Web sites, identify one or more attribute profiles 204 for applying to the appropriate hyperlinks 116. In addition, the selection engine 124 may modify selection criteria 206 in response to information received from the network 106. In some implementations, the selection engine 208 may receives instructions to modify one or more selection criteria 206 from the network 106. In some implementations, the selection engine 208 may dynamically modify one or more selection criteria 206 based, at least in part, on actions associated with the hyperlinks 116.

In one aspect of operation, the client 102 transmits, to the search engine 104, a request to identify Web sites associated with specified search criteria. In response to at least the request, the request engine 122 identifies one or more search indexes 202 in accordance with the search criteria and, using these search indexes, identifies Web sites associated with the search criteria. In connection with generating the Web page 112 including one or more hyperlinks, 116 the selection engine 208 identifies one or more attributes profiles 204 using the selection criteria 206. The request engine 122 generates the Web page 112 including the embedded hyperlinks 116 attributes values in accordance with the identified attribute profiles 204. The request engine 122 transmits the Web page 112 to the client 102 for display through GUI 110. As discussed above, the hyperlinks 116 may track actions associated with the displayed links 116. In response to a user performing a specific action, the links 116 generate or initiate the generation of a single UDP data packet including tracking information. As mentioned above, the link 116 may initiate an element that operates independent of the associated Web browser to transmit tracking information. In the case that the system 200 uses DNS, the link 116 may pass a unique hostname identifying tracking information to a local DNS resolver to initiate a DNS lookup request including the hostname, i.e., the tracking information. The hyperlink 116 may execute, initiate, or otherwise execute other independent elements, such as a Flash object, to generate a single UDP packet to transmit tracking information. In some implementations, the hyperlinks 116 may identify that a user has selected a Web site and transmit information identifying this information.

Figure 3:
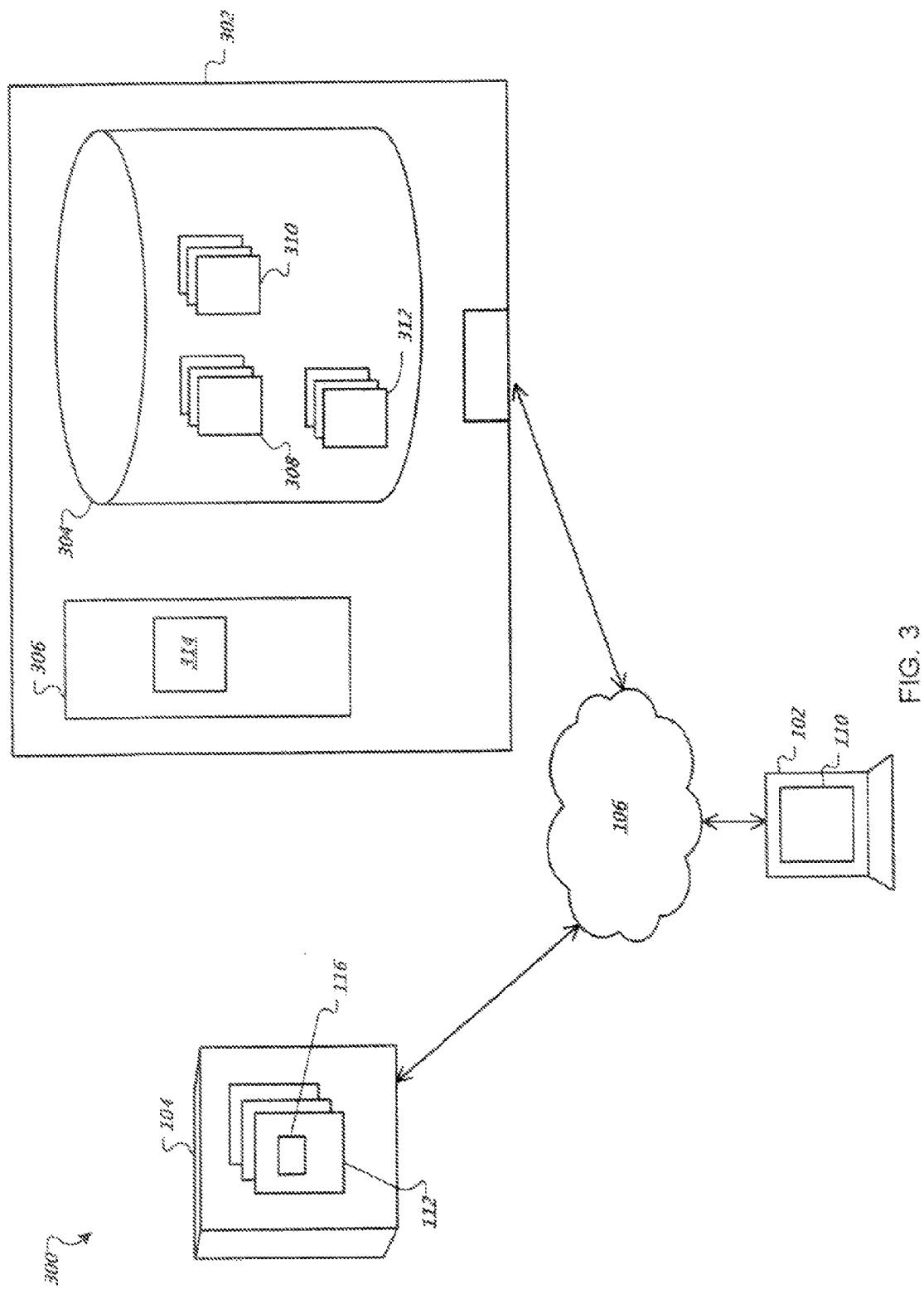
FIG. 3 is a block diagram illustrating an example system including trackable advertisements in accordance with some implementations of the present disclosure.

FIG. 3 illustrates a system 300 for providing trackable ads 116 using UDP. In the illustrated system 300, the content provider 104 provides Web pages 112 including ads 116 for tracking actions associated with the ads 116 (e.g., click throughs). At a high level, the system 300 includes the client 102, the content provider 104, and an ad server 302 coupled through the network 106. In general, the ad server 302 may receive a request for an ad to embed in a requested Web page 112 and, in response to the request, transmits a trackable ad 116 to the content provider 104. In some implementations, the ad 116 can include directives for generating and/or initiating the generation of a single UDP data packet (e.g., a DNS lookup request) for tracking actions associated with the ad 116. For example, the user of client 102 may click an ad 116 presented through GUI 110, and in response to at least the click, the ad 116 may generate a DNS resolution request for tracking the user's selection of the third-party Web site.

In addition to the elements described with respect to FIG. 1, the ad server 302 includes a memory 304 and a processor 306. The memory 304 includes ad images 308 for presenting advertisements, tracking elements 310 for tracking actions associated with the ad images 308, and selection criteria 312 for identifying criteria for selecting ad images 308. The process 306 includes the ad selection engine 314 for selecting one or more ad images 308 in response to a request. As for high-level description of the operation of the system 300, the client 102 transmits a request to the content provider 104 for a Web page 112 for displaying through the GUI 110. In response to at least the request, the content provider 104 transmits a request to the ad server 302 for an ad image 308 to embed in the requested Web page 112, or the client 102 may directly transmit a request to the ad server 302. Using the selection criteria 312, the selection engine 314 selects the ad image 308 and a tracking element 310 and transmits both the ad image 308 and the tracking element 310 to the content provider 104 for embedding the trackable ad 116 in the request Web page 112. The content provider 104 transmits the Web page 112 including the trackable ad 116 to the client 102 for display through the GUI 110.

As mentioned above in regards to the ad server 302, the memory 304 includes the ad images 308, tracking elements 310, and selection criteria 312. The ad images 308 include any parameters, pointers, variables, algorithms, instructions, rules, files, links, or other data for easily providing secondary content (e.g., images, text) for display through the GUI 110. While user context may be described in terms of "combinations," such various user context data may be stored or processed using at least one data structure, object, record or file. Such ad images 308 may include (among other things) primary content, secondary content, and/or sponsored content. For example, each ad image 308 may be a text element, a graphics element, a multimedia element, or any other graphical or display element. In a more specific example, the ad image 308 may include a static image in any suitable format such as JPG, GIF, and PNG. In certain implementations, the ad images 308 (or pointers thereto) may be stored in one or more tables in a relational database described in terms of SQL statements or scripts. In certain implementations, the ad images 308 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular ad image 308 may merely be a pointer to a third-party element stored remotely. In some implementations, a particular ad image 308 may be an internally stored advertisement for products and/or services provided by an independent advertiser. In short, the ad images 308 may comprise one table or file or a plurality of tables or files stored on one device or across a plurality of devices in any appropriate format. Indeed, some or all of ad images 308 may be local or remote without departing from the scope of this disclosure and store any type of appropriate data.

The tracking elements 310 include any parameters, variables, algorithms, instructions, rules, source or object code, objects or other directives for using DNS to track actions associated with the ad image 308. For example, the tracking element 310 may comprise source or executable code that generates or initiates the generation of a UDP data packet (e.g., a DNS resolution request) in response to at least an action associated with a user. In some implementations, the tracking element 310 may include one or more of the following: an event handler (e.g., onmousedown, onclick), an XmlHttpRequest, a hidden iframe, a Flash object, or other suitable source code and/or object code. In the case that the tracking element 310 initiates an element to generate a single UDP data packet, the tracking element 310 may initiate an element that operates independent of the Web browser that displays the ad image 308 (discussed in more detail below in reference to FIG. 4).

In some implementations, the tracking elements 310 may generate a DNS request for initiating a lookup request using User Datagram Protocol (UDP). Alternatively or in combination, the tracking elements 310 may generate a DNS request for initiating a lookup request using Transmission Control Protocol (TCP). To identify a specific action, the tracking element 310 may generate a hostname including information identifying a specific action, ad image 308, an instance, and/or user. In this case, the tracking elements 310 may generate a unique hostname or a unique hostname for a period of time. For example, the tracking elements 310 may generate a unique hostname using a combination of encryption and signing (for example using a combination of 3des and md5). In some implementations, the tracking elements 310 may combine an action identifier and a content identifier with other information to generate a hostname. In this case, the tracking elements 310 may generate the following hostname <action identifier>.<content identifier>.tracking.example.com, which may direct a DNS lookup request to special tracking servers associated with the host (discussed in more detail with respect to FIG. 4). In some implementations, the tracking elements 310 may generate a hostname that merely identifies a specific instance of the link 116 such as an ad identifier. In this case, the tracking elements 310 may generate the following hostname <ad identifier>.tracking.example.com. The generated hostname may implicitly identify the associated action such as a click through. As mentioned above, a substantially unique hostname may eliminate, minimize or otherwise decrease interference from DNS caching. In this case, these elements may be identified using any suitable string or other identifier. In some embodiments, the tracking element 310 may generate the strings or other identifiers that are unique for at least a period of time (e.g., 5 minutes, 30 minutes, 1 hour, 1 day). The tracking element 310 may combine an action identifier and a content identifier with other information to generate a hostname. In some implementations, the tracking element 310 may generate a hostname that merely identifies a specific instance of the ad image 308 such as an ad identifier. In this case, the tracking element 310 may generate the following hostname <ad identifier>.tracking.example.com. In some implementations, the generated hostname implicitly identifies the associated action such as a click through. As mentioned above, the tracking element 310, in the DNS example, may generate tracking information to avoid DNS caching. To reduce network traffic and latency, DNS includes DNS caching to cache domain names previously translated in the DNS system. In this case, DNS caching may prevent or otherwise interfere with the transmission of tracking information as a hostname. To eliminate, minimize, or otherwise decrease this type of interference, the tracking element 310 may generate hostnames that are substantially unique or unique for a period of time and/or initiate a DNS lookup request with a TTL of 0. In the case of the hostname being substantially unique, the DNS cache servers are unlikely to have the hostname stored in cache. In addition, some DNS cache servers can cache domain names for at least 5 minutes even if the TTL is smaller than the 5 minute interval. Nonetheless specifying a TTL of 0 can be beneficial to DNS servers that comply with the DNS specification since their cache may not get populated by the large number of unique names that the system 300 may generate.

The selection criteria 312 may include any parameters, variables, algorithms, instructions, rules, objects or other directives for selecting the links 116 for display in system 100. For example, the selection criteria 312 may identify current usage guidelines for the ad images 308. These guidelines may merely identify a simple rotation between the ad images 308 and/or a more complex system for selecting the ad images 308. For example, the selection criteria 312 may include mathematical and/or logical expressions for selecting the ad images 308 based on any appropriate parameter. Alternatively or in addition to a set guideline, the selection criteria 312 may include different criteria based, at least in part, on other aspects such as periods of time, user information, web page content, and/or others. For example, the selection criteria 312 may include criteria for selecting the ad images 308 (e.g., advertisement) during specified holidays (e.g., Easter season, Christmas) and/or criteria for different aspects of a user (e.g., location, native language, demographics). In short, the selection criteria 312 may include any appropriate information for selecting the ad images 308. In the case of search results, the selection criteria 312 may include text associated with Web pages identified in search results.

The processor 306 executes the selection engine 314 at any appropriate time such as, for example, in response to a request or input from a user of the ad server 302 or any appropriate computer system coupled with the network 106. The selection engine 314 can be of the form of software, for example, operable to provide the ad image 308 and the tracking element 310 to the content provider 104. In some implementations, the selection engine 314 identifies the selection criteria 312 in response to a request for an ad image 308 from the content provider 104. The selection engine 314 may identify usage guidelines in the selection criteria 312 and based, at least in part, on the usage guidelines identify an ad image 308 and a tracking element 310. After identifying the ad image 308 and the tracking element 310, the selection engine 314 may transmit the ad image 308 and the tracking element 310 to the content provider 104 using network 106. In some implementations, the selection engine 314 can update or otherwise modify selection criteria 312 in accordance with information received from the network 106. For example, the selection engine 314 may modify selection criteria 312 in response to a request and/or dynamically modify selection criteria 312 based, at least in part, on actions associated with the ad images 308. While illustrated as a module of the ad server 302, the selection engine 314 may be integrated into another network device that manages ad request from the network 106.

In one aspect of operation, the client 102 transmits a request for a Web page 112 to the content provider 104. In response to at least the request, the content provider 104 identifies the requested Web page 112 and transmits a request to the ad server 302 for one or more ad images 308 to embed in the request Web page 112. The selection engine 314 identifies selection criteria 312 in response to at least the request and, using the identified selection criteria 312, identifies one or more ad images 308 for embedding in the Web page 112. In addition, the ad server 302 identifies a tracking element 310 for tracking actions associated with the selected ad image 308. In some implementations, the tracking element 310 generates or initiates the generation of a single UDP packet in response to a user's action. For example, the tracking element 310 may track click-throughs associated with an ad image 308. The ad server 302 transmits the identified ad images 308 and the tracking element 310 to the content provider 104 for embedding in the identified Web page 112 as the trackable ad 116.

Figure 4:
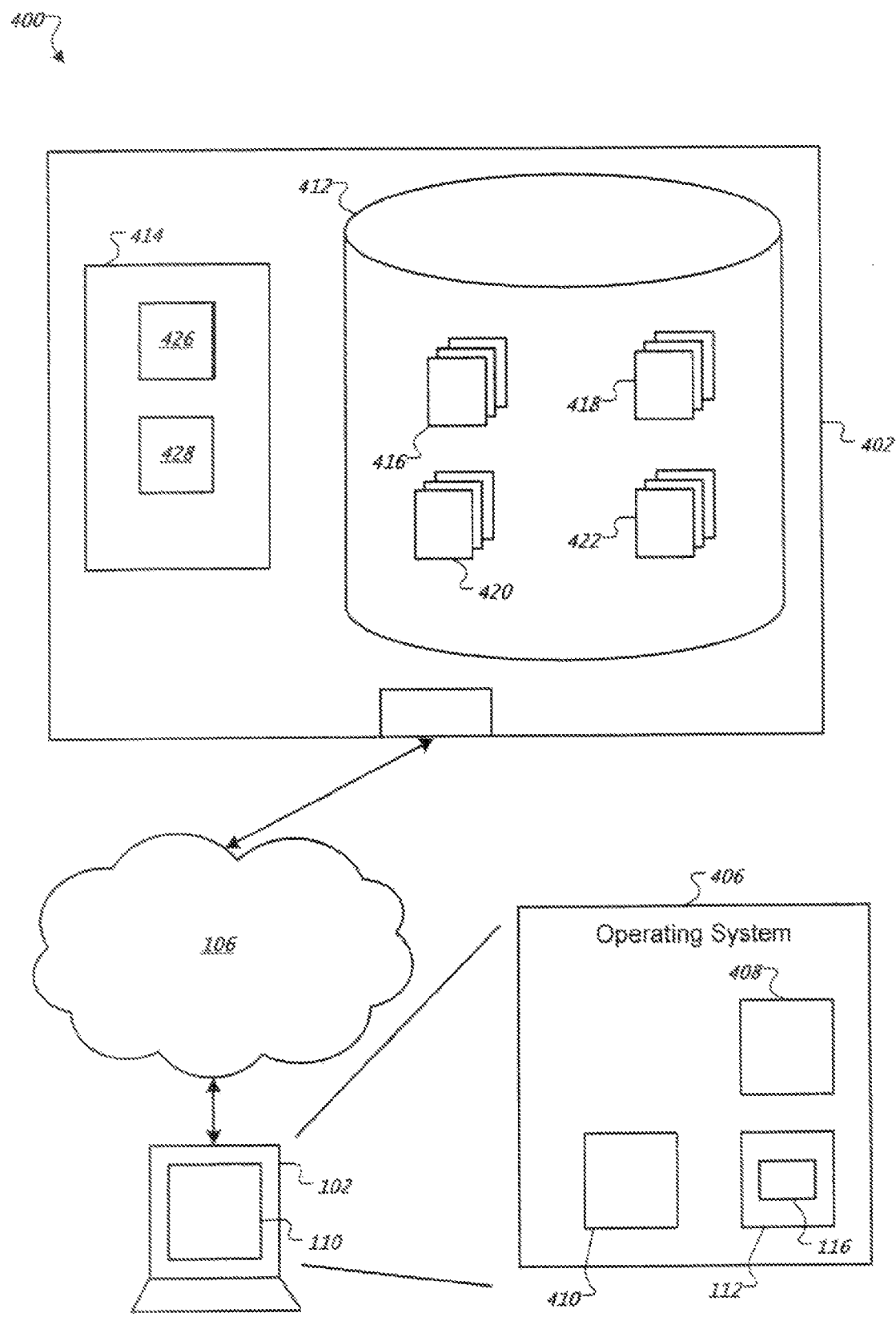
FIG. 4 is a block diagram illustrating an example tracking system in accordance with some implementations of the present disclosure.

FIG. 4 illustrates an example tracking system 400 for tracking actions associated links 116 displayed through a Web browser 408. As discussed above, the tracking system 400 may implement several different processes for tracking actions such as generating UDP packets. For example, the tracking system 400 may execute a Flash object to generate single UDP data packets including tracking information. In some examples, the tracking system 400 may execute a local DNS resolver to generate DNS lookup request including tracking information. In this case, links 116 displayed through the GUI 110 may initiate a DNS resolution request in response to a user's action such as a click through. The system 400 may use TCP and/or UDP to transmit such lookup requests. In the case of UDP, the UDP request may include a single UDP data packet and the UDP reply may also include a single UDP data packet. In transmitting only a single packet in the UDP request and the UDP reply, the system 400 may reduce, minimize, or otherwise decrease latency associated with tracking actions. Also, the system 400 may use TCP to perform DNS lookup. In contrast to UDP, TCP includes a 3-way handshaking process to transfer information, and as a result, the latency associated with TCP is greater than the latency associated with UDP. The system 400 may use TCP in the event that a DNS request exceeds a threshold (e.g., 512 bytes).

In the illustrated implementation, the tracking system 400 uses DNS to generate a single UDP packet that includes tracking information. Accordingly, the system 400 is describe with respect to DNS but may execute or otherwise implement other elements for using UDP to track actions associated with links 116. Alternatively or in combination, the system 400, as mentioned above, may use other tracking elements (e.g., javascript, Flash object) to track actions associated with one or more links. In some implementations, the system 400 tracks actions associated with the link 116 independent of the Web browser 408 displaying the link 116. In other words, the link 116 may pass tracking information to an element located in the client 102 that generates and/or transmits UDP data packets independent of the Web browser 408. In doing so, the system 400 may maximize, enhance, or otherwise increase reliability of tracking actions because tracking process may execute separate from the Web browser 408. For example, the Web browser 408 may present a new Web page while the system 400 is tracking actions associated with a Web page previously displayed through the Web browser 408.

At a high level, the system 400 includes the client 102 and a DNS server 402 coupled through the network 106. While the DNS server 402 is illustrated as separate from the content server 104, the DNS server 402 and the content server 104 may be the same server without departing from the scope of this disclosure. In the illustrated implementation, the client 102 includes the Web browser 408, an operating system 406, a local DNS resolver 410, a Web page 112, and a link 116. In this implementation, the client 102 includes a GUI 110 for displaying Web pages 112 using the Web browser 408 and the local DNS resolver 410 processes DNS resolution requests generated by the operating system 406. The DNS server 402 locally stores translation files 416 used for translating domain names to IP addresses and/or different domain, names, log files 418 for storing information associated with links 116, evaluation criteria 420 for storing criteria to evaluate the log files 418, and evaluation reports 422 for storing reports based on evaluations of actions identified in the log files 128. In addition, the DNS server 402 includes a DNS engine 426 for processing DNS lookup request and an evaluation engine 428 for evaluating log files 418 using the evaluation criteria 420 and generating the evaluation reports 422.

Turning to a high level description of the operation of the illustrated tracking system 400, in response to at least an action associated with a displayed link 116, the Web browser 408 may generate a DNS resolution request and pass the resolution request to the local DNS resolver 410. The DNS resolver 410 generates a DNS lookup request using the domain name included in the resolution request and transmits the DNS request to the DNS server 402. The DNS engine 426 identifies the domain name included in DNS lookup request and translates at least a portion of the domain name using translation files 416. DNS engine 426 may translate the portion into an IP address and/or a different hostname. In some implementations, the DNS engine 426 translates the received domain name into a CNAME record and an IP address. The DNS engine 426 stores the portion of the hostname associated with the link 116 in one or more log files 418. The DNS engine 426 transmits the DNS lookup response to the client. In the CNAME example, the DNS engine 426 may transmit the IP address in the "additional" section of the DNS response. In response to an event, the evaluation engine 428 identifies one or more evaluation criteria 420 and evaluates one or more log files 418. The evaluation engine 428 generates one or more evaluation reports 422 based, at least in part, on the evaluation.

As for the description of the illustrated elements, the operating system 406 can include software that manages hardware and software resources of the client 102. For example, the operating system 406 manages services used by application programs executed by the client 102. For example, such services may include one or more of the following: recognizing input from the keyboard, sending output to the display screen, keeping track of files and directories on the disk, sharing memory between multiple application programs, controlling the time and order that application programs run, controlling peripheral devices such as disk drives and printers, and other services. Typically, an application program interacts with the operating system 406 through an application program interface (API), and a user of client 102 may interact with the operating system 406 through a user interface such as a command line or the GUI 110. The operating system 406 may comprise Linux, UNIX, Windows, or any other operating system. In the illustrated implementation, the operating system 406 manages the Web browser 408 and the local DNS resolver 410.

The Web browser 408 can include software that enables the client 102 to display the Web pages 112. As discussed above, the Web pages 112 include text, images, sound, multimedia, and other information. In some implementations, the Web browser 408 may uses Hypertext Transfer Protocol (HTTP) to make requests of Web servers (e.g., the content server 104, DNS server 402) through the network 106. These request may be initiated using different interactive elements. For example, the Web browser 408 may display a Web page 112 that includes a link 116 embedded in a displayed element such as text, an image, and/or other element. Alternatively or in combination, the Web browser 408 may include an address field that a user may enter a URL associated with one or more Web pages 112. In either case, the Web browser 408 may forward the domain name in a resolution request to the local DNS resolver 410 to translate the domain name to an IP address and/or a different hostname (e.g., CNAME).

The local DNS resolver 410 can include software for generating and transmitting a DNS lookup request. For example, the local DNS resolver 410 may receive a resolution request from an application program (e.g., the Web browser 408) executed by the client 102. Other application programs may include mail clients, different Web browsers, and other Internet applications. In some implementations, the local DNS resolver 410 may include or otherwise be associated with a local cache (not illustrated) that stores network addresses for at least some previously translated domain names. In the event that the local cache does not include the translation, the local DNS resolver 410 may generate and transmit a translation request, i.e., a DNS lookup request, to the appropriate DNS server through the network 106. The DNS resolution process may include querying multiple DNS servers before locating the destination DNS server that includes the associated network address and/or different hostname. As mentioned above, the local DNS resolver 410 may use TCP and/or UDP to transmit the lookup request. In the case of UDP, the local DNS resolver 410 transmits to the network 106 a single packet including a hostname. In the illustrated implementation, the included hostname includes or otherwise identifies an action associated with a link 116. For example, the hostname may identify that the action was a click and the link 116 was a specific display element (e.g., hyperlink, ad). In another example, the hostname may identify that the action was a click through and the element was a hyperlink to a third-party Web site. In some implementations, the domain name comprises the following format: <action identifier>.<element identifier>.tracking.example.com. In some implementations, the domain name comprises the following format: <ad identifier>.tracking.example.com. Also, the local DNS resolver 410 may use TCP to perform DNS lookup. In some implementations, the local DNS resolver 410 executes independently of the Web browser 408. In this case, after receiving a resolution request from the Web browser 408, additional actions performed by the Web browser 408 may not affect the local DNS resolver 410 from processing the resolution request. In other words, the local DNS resolver 410 may continue to generate a DNS lookup request even though the Web browser 408 is directed to a different Web page 112. In the illustrated implementation, the DNS lookup request may be routed to the DNS server 402.

DNS server 402 comprises a computing device operable to receive, transmit, process and store data associated with system 400. DNS server 402 includes memory 412 and illustrated processor 414. In the illustrated implementation, the memory 412 includes translation files 416, log files 418, evaluation criteria 420, and evaluation reports 422. The translation file 416 comprises instructions, data mappings, algorithms, or any other directive used by DNS server 402 to convert a domain name to a network address and/or a different hostname. As used herein, convert means to swap, translate, transition, or otherwise modify one or more characters. The translation file 416 may include one or more of the following parameters: one or more domain names, one or more IP addresses, one or more associated hostnames, one or more record types, one or more TTLs, and others. The translation file 416 may be any suitable format such as, for example, an XML document, a flat file, CSV file, a name-value pair file, SQL table, an array, an object, or others. The translation file 416 may be any suitable data structure such as an array, matrix, list, table, or any other suitable structure that maps a domain name to a network address and/or a different hostname. The translation file 416 may be dynamically created or populated by DNS server 402, a third-party vendor, any suitable user of DNS server 402, loaded from a default file, or received using network 106. The term "dynamically" as used herein, generally means that the appropriate processing is determined at run-time based upon the appropriate information. The translation file 416 may be associated with a single domain name or a plurality of domain names or a single domain name may be associated with a plurality of translation files 416.

The log files 418 include one or more data structures or entries that identify or include information that identifies actions associated with the links 116. For example, one or more log files 418 may include or identify actions associated with a specific link 116 (e.g., advertisement) such as clickthroughs. In some implementations, the log files 418 may identify or include information that identifies one or more of the following parameters: event, document, instance of a link 116, a time, date, time link 116 transmitted by content provider 104, date link 116 transmitted by content provider 104, user, client, a publisher, an advertiser, and/or a search engine. The log file 418 may be associated with a specific link 116, multiple links 116, a single content provider 104, multiple content providers 104, a single advertiser or multiple advertisers or multiple log files 418 may be associated with a single content provider 104, a single advertiser, and/or a single content provider 104. In some implementation, the association may be based on a parameter such as demographic, region, or other parameters. For example, a first log file 418 may be associated with a first geographic region and a second log file 418 may be associated with a second geographic region. In some implementations, the log files 418 maybe formatted, stored, or defined as various data structures in text files, XML documents, VSAM files, flat files, Btrieve files, CSV files, internal variables, or one or more libraries. In short, the log files 418 may comprise one table or file or a plurality of tables or files stored on one computer or across a plurality of computers in any appropriate format. Moreover, the log files 418 may be local or remote without departing from the scope of this disclosure and store any type of appropriate data.

Evaluation criteria 420 include any parameters, variables, algorithms, instructions, rules, objects or other directives for evaluating the actions associated with the links 116. For example, the evaluation criteria 420 may be used to determine action rates associated with specific links 116. In some examples, evaluation criteria 420 may be used to modify the use of one or more selection criteria 122 based, at least in part, on actions associated with different links 116. As mentioned above, such actions may include one or more of the following: clicks, click throughs, viewing time, and other interactions of a viewer with link 116. In some implementations, evaluation criteria 420 may include mathematical expressions for computing results (e.g., action rates) of the link 116 based on associated actions, criteria for evaluating the results, and/or modifications to selection criteria 122 in the event that the criteria are satisfied. In terms of computing results, evaluation criteria 420 may identify expressions to determine action rates such as click through rates (CTR) or other suitable results associated with links 116. Using such results, evaluation criteria 420 may define criteria such as a logical expression for evaluating the links 116. For example, the criteria may be used identify those links 116 having the highest or lowest action rates. In this case, the evaluation criteria 420 may be used to identify the links 116 and/or attributes of links 116 that maximize or otherwise increase action rates. Alternatively or in addition to merely examining the action rates, the evaluation criteria 420 may include different criteria based, at least in part, on other aspects such as periods of time, user information, Web-page content, and/or others. For example, the evaluation criteria 420 may include criteria for evaluating action rates during specified holidays (e.g., Easter season, Christmas) and criteria for evaluating click-through rates for different aspects of a user (e.g., location, native language, demographics).

In connection with evaluating the graphical elements, the evaluation criteria 420 may include instructions for modifying criteria for selecting links 116 (e.g., selection criteria 206, selection criteria 312) based, at least on, the results satisfying certain criteria and/or violating a threshold. In some implementations, the evaluation criteria 420 may indicate that all links 116 should be eliminated except the one or more links 116 with the highest action rates. In some implementations, the evaluation criteria 420 may indicate that all attribute profiles 204 should be eliminated except the one or more profiles 204 that result in the highest click-through rates. In the case that the lowest action rate is identified, the evaluation criteria 420 may identify guidelines that eliminate the application of that link 116 and/or attribute profile 204. In some cases, the evaluation criteria 420 may identify instructions that eliminate all links 116 except for the one that produces the highest action rate. The modification to the usage guidelines may include one or more of the following: eliminating use of certain links 116 and/or attribute profiles 204, varying use of certain links 116 and/or attribute profiles 204 based on certain periods of time, varying use of certain links 116 and/or attribute profiles 204 based on user demographics, and/or others. In addition, the evaluation criteria 420 may specify an event such that the log files 418 are evaluated. The event may include one or more of the following: a period of time, a number of request for the link 116, a number of conversions, a request, and/or other suitable events.

The evaluation reports 422 include one or more entries or data structures that identify or include information that identifies evaluation results. For example, the evaluation report 422 may identify a summary of actions associated with a specific link 116. In some implementations, the evaluation report 422 includes a total number of click throughs associated with an advertisement. In some implementations, the evaluation report 422 may include click-through rates associated with different attribute profiles 204. The information included in the evaluation report 422 may be based on any appropriate parameter such as period of time, geographic region, demographics, operating system, and/or other values. In summary, the evaluation report 422 may include one or more of the following: number of actions, type of action, type of link 116, specific link 116, specific attribute profile 204, and/or actions aggregated based on a parameter. The evaluation report 422 may be associated with a specific link 116, multiple links 116, a specific attribute profile 204, multiple attribute profiles 204, a single content provider 104, multiple content providers 104, a single advertiser or multiple advertisers or multiple evaluation reports 422 may be associated with a single content provider 104, a single advertiser, and/or a single content provider 104. In some implementation, the association may be based on a parameter such as demographic, region, or other parameters. For example, a first evaluation report 422 may be associated with a first geographic region and a second evaluation report 422 may be associated with a second geographic region. In some implementations, the evaluation reports 422 may be formatted, stored, or defined as various data structures in text files, XML, documents, VSAM files, flat files, Btrieve files, CSV files, internal variables, or one or more libraries. In short, evaluation reports 422 may comprise one table or file or a plurality of tables or files stored on one computer or across a plurality of computers in any appropriate format. Moreover, the evaluation reports 422 may be local or remote without departing from the scope of this disclosure and store any type of appropriate data.

The illustrated processor 414 includes a DNS engine 426 and an evaluation engine 428. The DNS engine 426 converts at least a portion of a domain name to a network address and/or a different hostname (e.g., CNAME). In general, the DNS engine 426 may perform one or more of the following functions: receive lookup requests from network 106, identify domain names using the requests, identify actions using the requests, identify a link 116 using the request, translate at least a portion of the domain name into a network address and/or different hostname, store information associated with actions, links 116 and/or attribute profiles 204 in log files 418, and/or other functions. In some implementations, the DNS engine 426 may issue, to the local DNS resolver 410, a CNAME for resolution of the domain name identified in DNS lookup request. In this case, the DNS engine 426 may include the IP address of the CNAME in the "Additional Section" of the DNS reply. In including the IP address, DNS engine 426 may eliminate the lookup part of the customer's domain name and may reduce the cost of the transaction even further.

Evaluation engine 428 may evaluate actions associated with links 116 based on any suitable process. In general, evaluation engine 428 may store information associated with a link 116, evaluate log files 418 using evaluation criteria 420, and/or generate evaluation reports 422 based on evaluations. In terms of storing information, the evaluation engine 428 may receive information associated with a link 116 provided to the content provider 104 from the content provider 104 and/or information associated with actions of a viewer in response to the link 116 from client 102. In response to receiving tracking information, the evaluation engine 428 may identify one or more log files 418 associated with the link 116 and store at least a portion of the received information in the identified log files 418. As for the evaluation, the evaluation engine 428 may initiate the evaluation process in response to an event such as the expiration of a period of time, a request, and/or other events. In some implementations, the evaluation engine 428 identifies the event in evaluation criteria 420. Using the evaluation criteria 420, the evaluation engine 428 evaluates one or more log files 418. As mentioned above, the evaluation may include performing calculations as well as evaluating logical expressions. In some implementations, the evaluation engine 428 may transmit a request to the content provider 104 to modify one or more selection criteria (e.g., selection criteria 206, selection criteria 312) in response to at least the evaluation. Based, at least in part on the results, of the evaluation, the evaluation engine 428 may generate one or more reports 422.

In one aspect of operation, the Web browser 408 receives a user selection associated with a displayed link 116 that initiates a DNS resolution request, and in response to at least the action, the Web browser 408 passes the resolution request to the local DNS resolver 410. The DNS resolver 410 identifies a domain name using the resolution request and transmits a DNS lookup request to the DNS server 402 through the network 106. In some implementations, the local DNS resolver 410 operates independent of the Web browser 408. In response to at least DNS lookup request, the DNS engine 426 identifies a domain name based, at least in part, on the DNS lookup request. The DNS engine 426 identifies a portion of the hostname including information associated with actions of a user and a portion associated with a network element. The DNS engine 426 identifies the translation file 416 associated with the domain name and translate the network portion to an IP address and/or different hostname (e.g., CNAME) using the identified translation file 416. The DNS engine 426 transmits the IP address and/or different hostname to the local DNS resolver 410. In some implementations, the DNS engine 426 transmits a CNAME in the "Answer Section" and the IP address in the "Additional Section" of the DNS reply. In connection with the translation, the DNS engine 426 stores the tracking information in one or more log files 418 associated with the link 116 and/or attribute profile 204. The evaluation engine 428 evaluates the tracking information associated with the link 116 and/or attribute profile 204 in response to an event (e.g., period of time, number of actions). The evaluation engine 428 identifies one or more evaluation criteria 420 associated with the link 116, and the evaluation engine 428 evaluates the tracking information using the log files 418 and the evaluation criteria 420. In response to the tracking information satisfying a threshold, the evaluation engine 428 may transmit a request to the content provider 104 to modify selection criteria (e.g., selection criteria 206, selection criteria 312) associated with link 116 and/or attribute profile 204. In addition, the evaluation engine 428 may generate and/or update one or more evaluation reports 422 based, at least in part, on the evaluation of the tracking information associated with the link 116.

Figure 5:
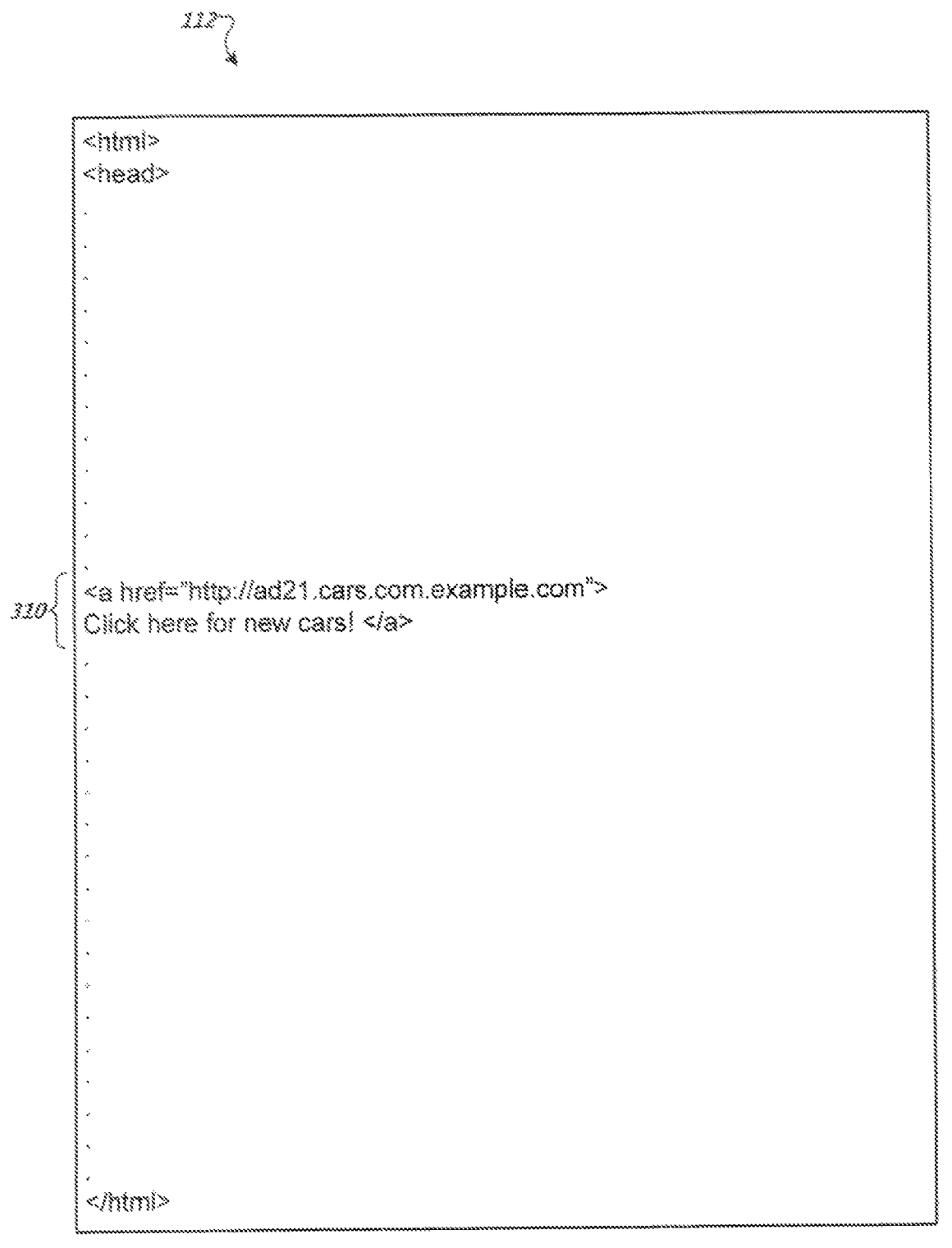
Figure 6:
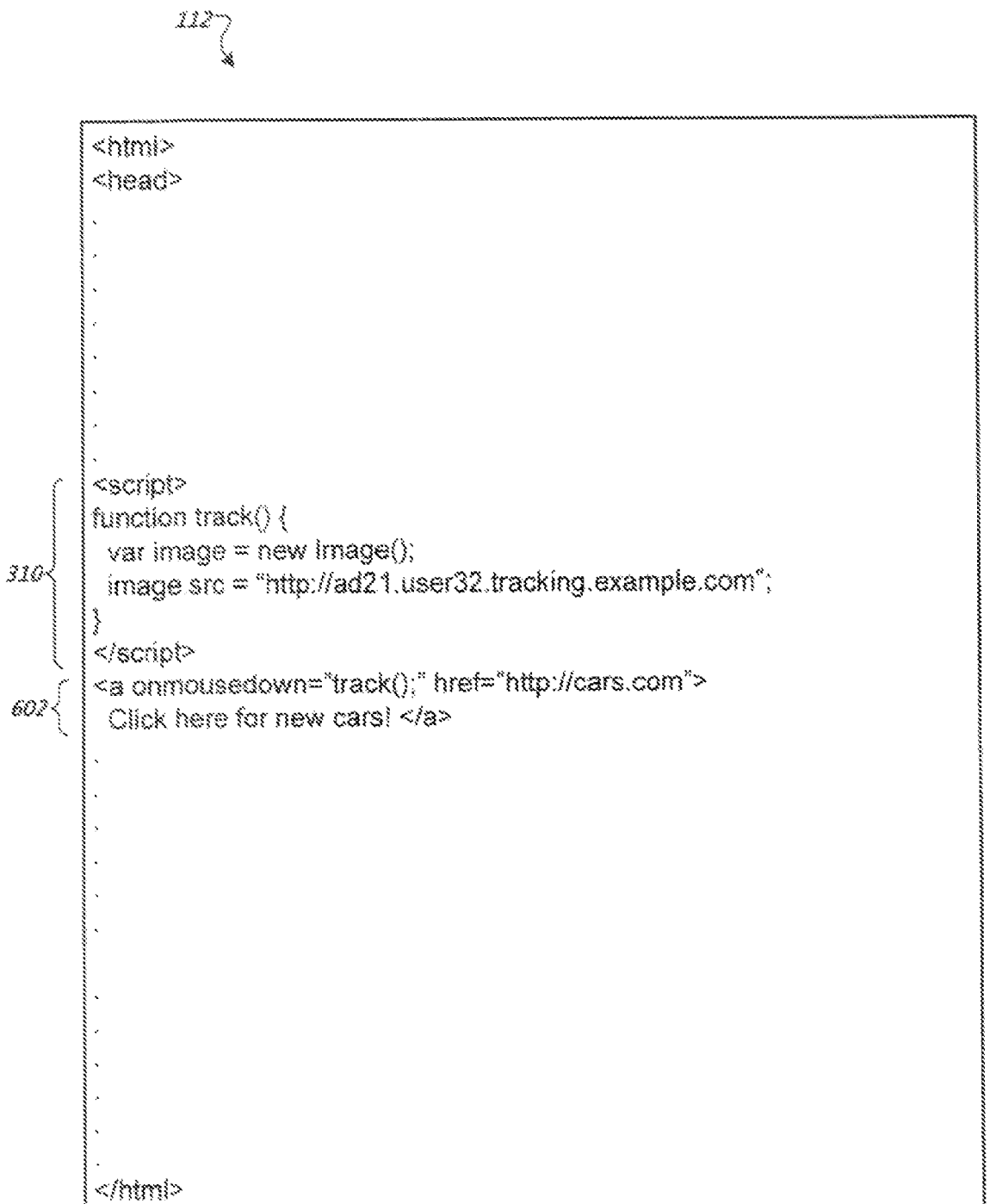

FIGS. 5 and 6 are example Web pages 112 including a trackable link 116. It will be understood that the illustrated page is for example purposes only. Accordingly, the GUI 110 may include or present links 116, in any format or descriptive language and each page may present any appropriate advertisements in any layout without departing from the scope of the disclosure.

Referring to FIG. 5, the Web page 112 illustrates a Web page written in HTML code. In the illustrated implementation, the Web page 112 includes the tracking element 310 for tracking actions associated with a hyperlink 116. The tracking element 310 includes a script for mapping a domain name to a different hostname and operable to identify an instance advertisement displayed through GUI 110. In the illustrated example, the tracking element 310 generates a resolution request in response to a user of client 102 clicking on the text "Click here for new cars!" present through the GUI 110. In this case, the resolution request includes the following hostname: ad21.cars.com.example.com. In this case, the domain name "example.com" identifies DNS server 402 and "ad21.cars.com" identifies tracking information. In particular, the tracking information identifies an instance of an advertisement and an advertiser. In this case, DNS server 402 may map the domain name to a different hostname (e.g., CNAME).

Referring to FIG. 6, the Web page 112 includes the tracking element 310 and Hypertext REFerence (href) 602. The tracking element 310 includes a script for resolving a domain name operable to identify an action and a user using DNS. In the illustrated implementation, the tracking element 310 includes an image source (img src) tag for generating a resolution request for the local DNS resolver 410. In this case, the resolution request includes the following domain name: ad21.user32.tracking.example.com. In this case, "tracking.example.com" identifies DNS server 402, and "ad21.user32" identifies information for tracking actions associated with the link 116. Indeed, the domain name identifies that the link 116 has 21 as an identifier and the user of client 102 has 32 as an identifier. Href 602 includes information for directing a selection from a user of the client 102 to an advertiser. In response to the user clicking the text "Click here for new cars!," the Href 602 identifies a domain name to direct the Web browser 408. In some implementation, after the tracking element 310 passes the resolution request to the local DNS resolver 410, additional processes performed by the Web browser 408 does not terminate DNS lookup request and, thus, does not terminate the tracking process.

Figure 7:
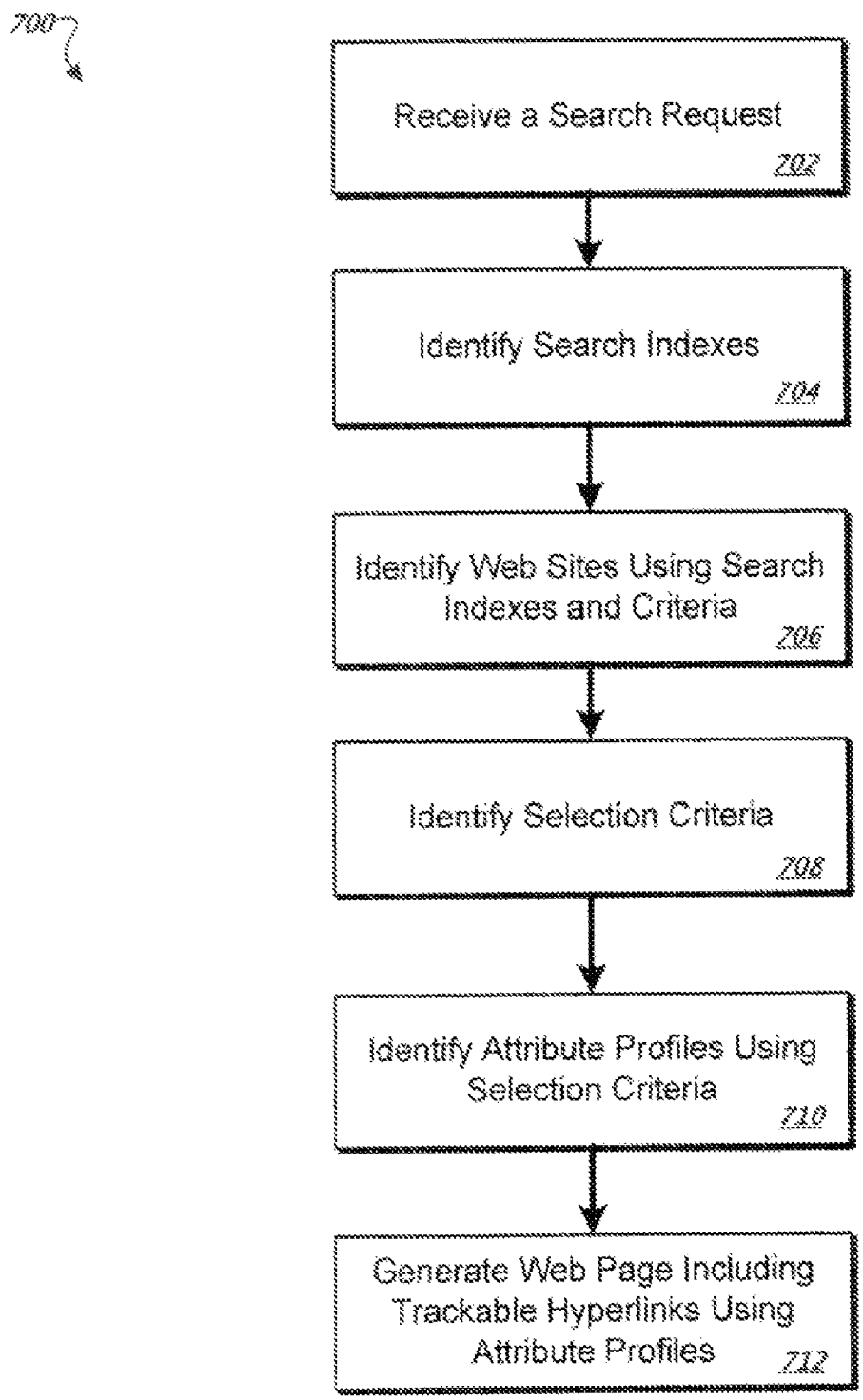
FIG. 7 is a flow diagram illustrating an example method for providing trackable hyperlinks in the system of FIG. 2.

FIG. 7 is a is a flowchart illustrating an example method 702 for providing trackable links 116 in accordance with some implementations of the present disclosure. Generally, method 700 describes an example technique where hyperlinks 116 are selected for embedding in a Web page 112. System 200 contemplates using any appropriate combination and arrangement of logical elements implementing some or all of the described functionality.

The method 700 begins at step 702 where a search request is received. For example, the search engine 104 may receive a search request transmitted by the client 102. At step 704, search indexes are identified. In the example, the request engine 122 may identify one or more search indexes 202 in response to at least the request. Web sites are identified using the search indexes and the search criteria included in the request at step 706. Again turning to the example, the request engine 122 may compare the search criteria to the identified search indexes 202 to determine one or more associated Web sites. At step 708, selection criteria are identified, and at step 710, one or more attribute profiles are identified using the selection criteria. As for the example, the selection engine 208 may identify one or more attribute profiles 204 using the selection criteria 206. Next, at step 712, Web page including hyperlinks to the identified Web sites is generated in accordance with the attribute profiles. In the example, the request engine 122 may set values of the hyperlinks 116 associated with the Web sites using the identified attribute profiles 204 in generating the Web page 112.

Figure 8:
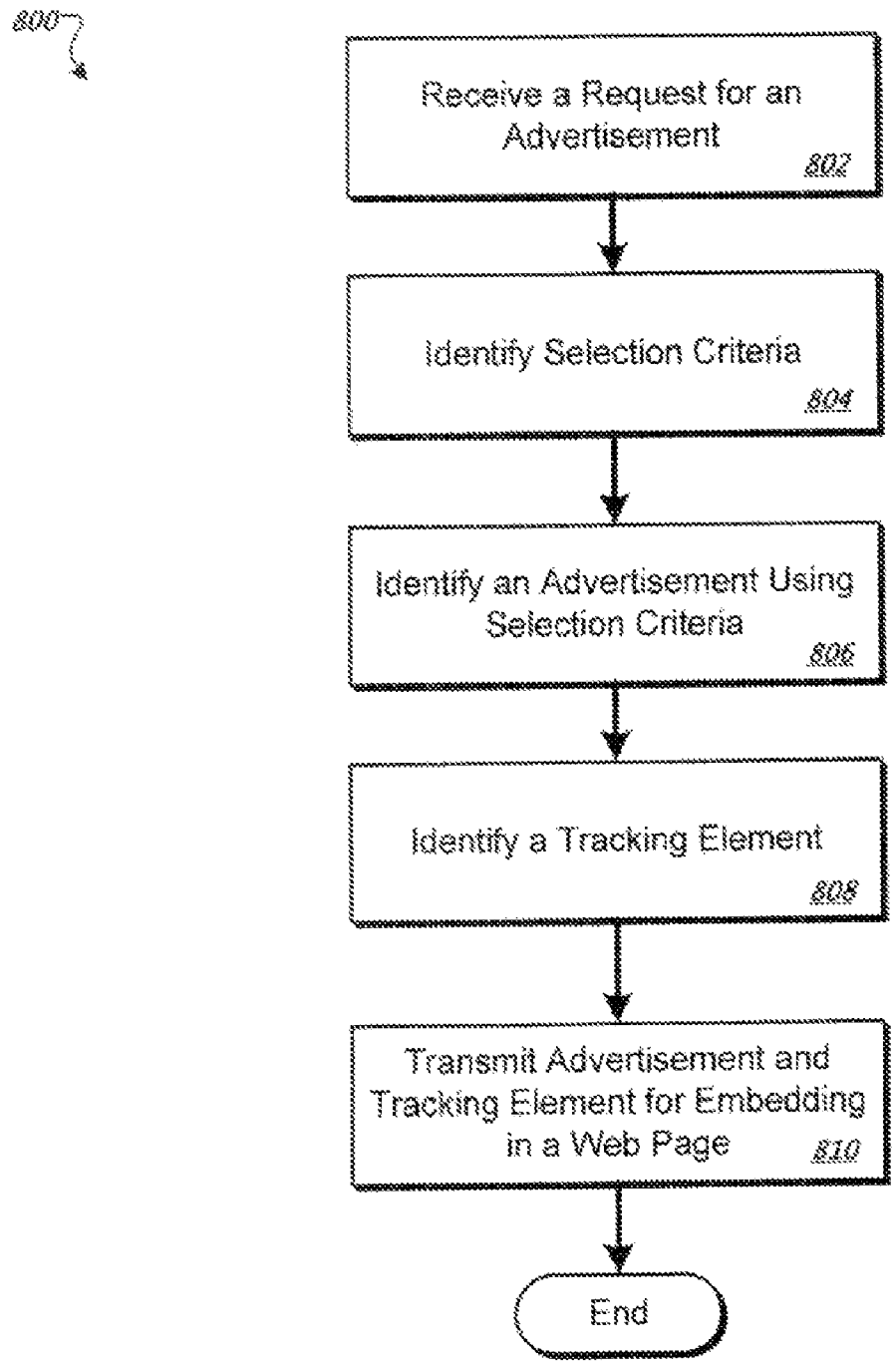
FIG. 8 is a flow diagram illustrating an example method for providing trackable advertisements in the system of FIG. 3.

FIG. 8 is a flowchart illustrating an example method 800 for providing trackable advertisements in accordance with some implementations of the present disclosure. Generally, method 800 describes an example technique where advertisements are selected for embedding in Web pages in accordance with selection criteria. System 300 contemplates using any appropriate combination and arrangement of logical elements implementing some or all of the described functionality.

Method 800 begins at step 802 where a request for an advertisement is received. For example, in response to a request for a Web page 112 from the client 102, the content provider 104 may transmit a request for an advertisement to embed in the request Web page 112. At step 804, criteria for selecting an advertisement are identified. In the example, the selection engine 314 may identify the selection criteria 312 for selecting one of the links 116 to transmit to the content provider 104. Next, at step 806, an advertisement is selected using the selection criteria. Again in the example, the selection engine 314 may select the link 116 using the selection criteria 312. At step 808, an element configured to track actions associated with the selected advertisement is identified. As for the example, the selection engine 314 identifies the tracking element 310 configured to track actions associated with the link 116. The advertisement and the tracking element are transmitted for embedding in a Web page 112 at step 810. Continuing with the example, the selection engine 314 transmits the link 116 and the tracking element 310 to the content provider 104 for embedding in the request Web page 112.

Figure 9A:
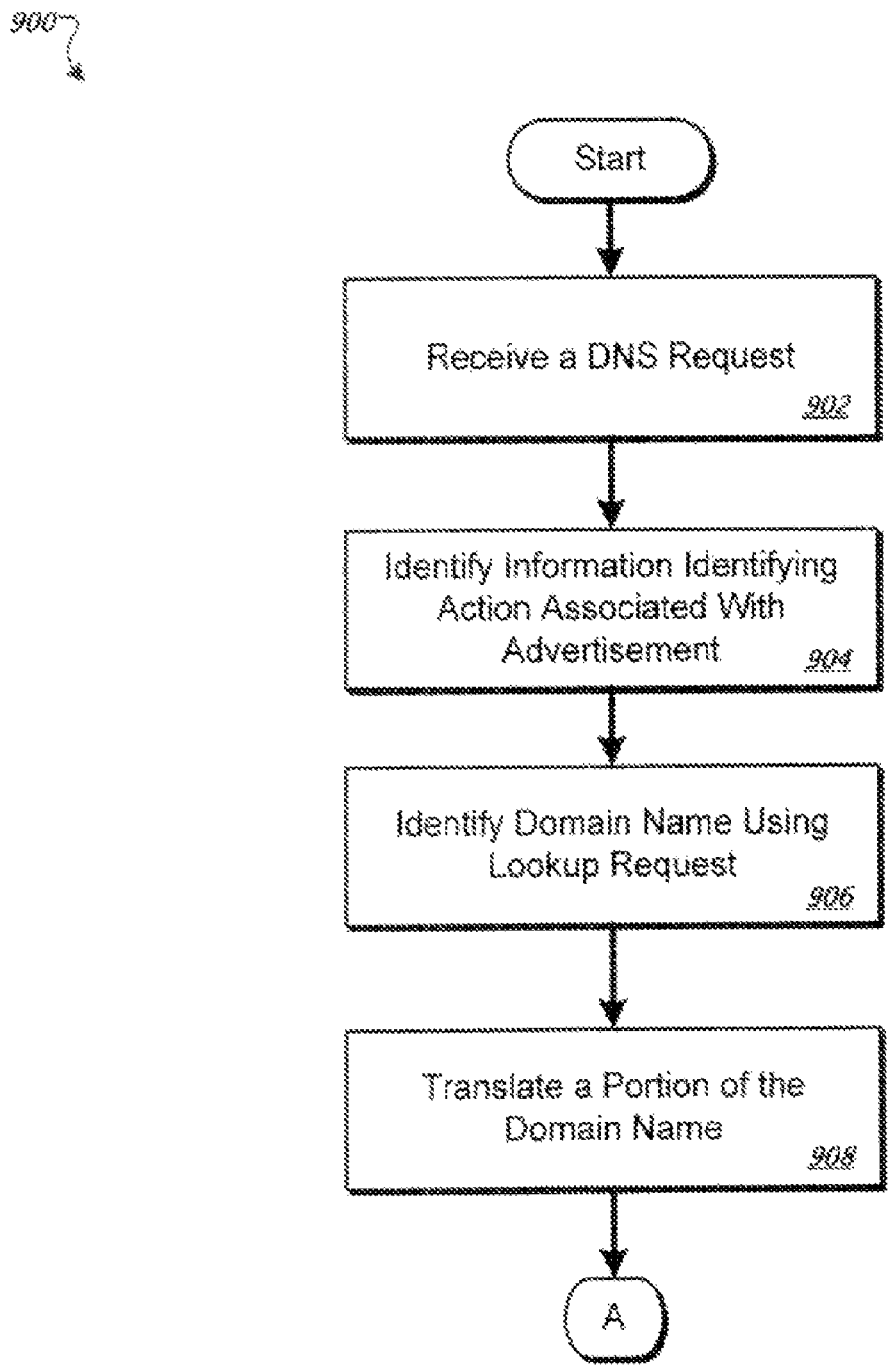
FIG. 9 is a flow diagram illustrating an example method for tracking actions associated with links displayed in the tracking system of FIG. 4.
Figure 9B:
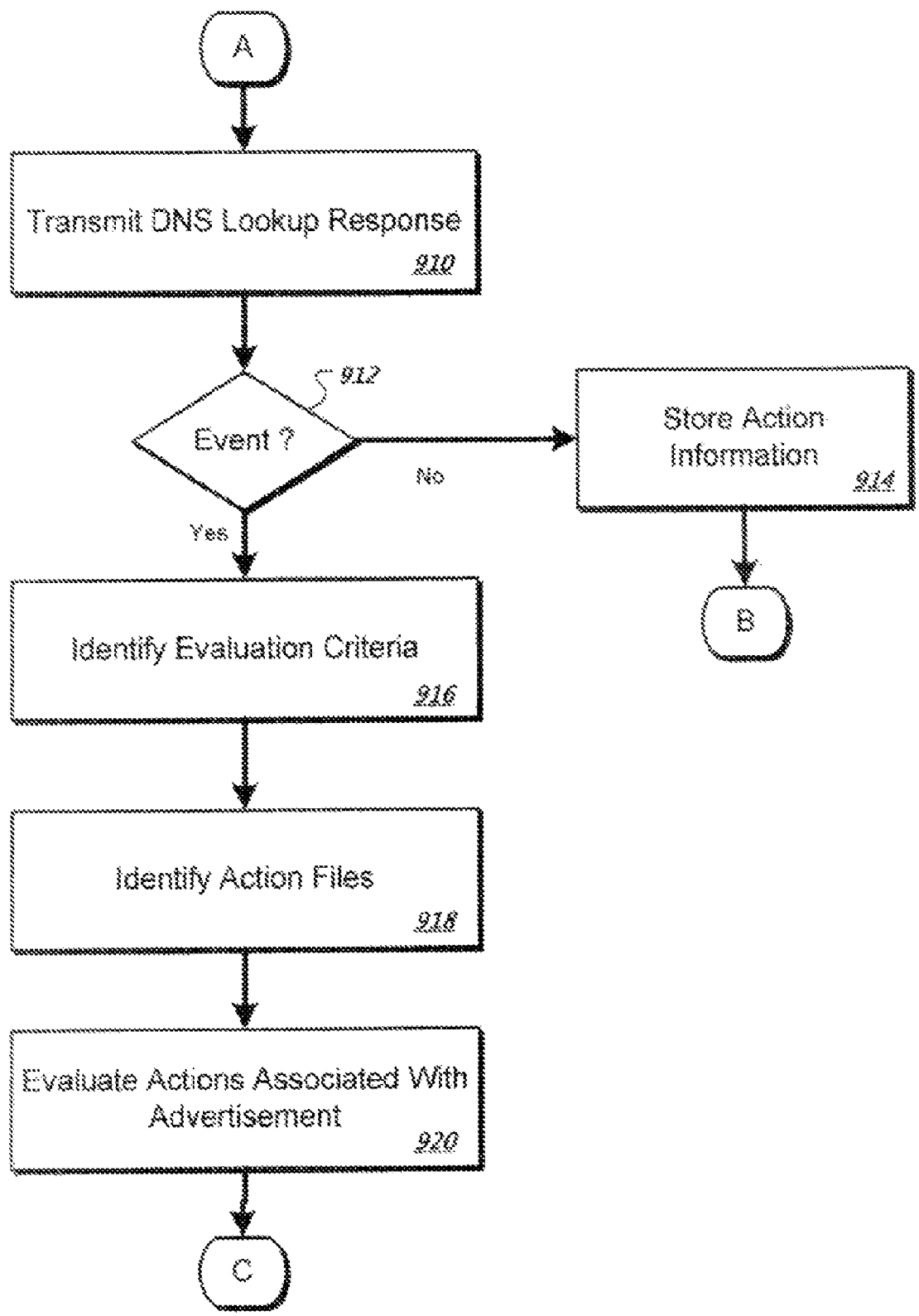
Figure 9C:
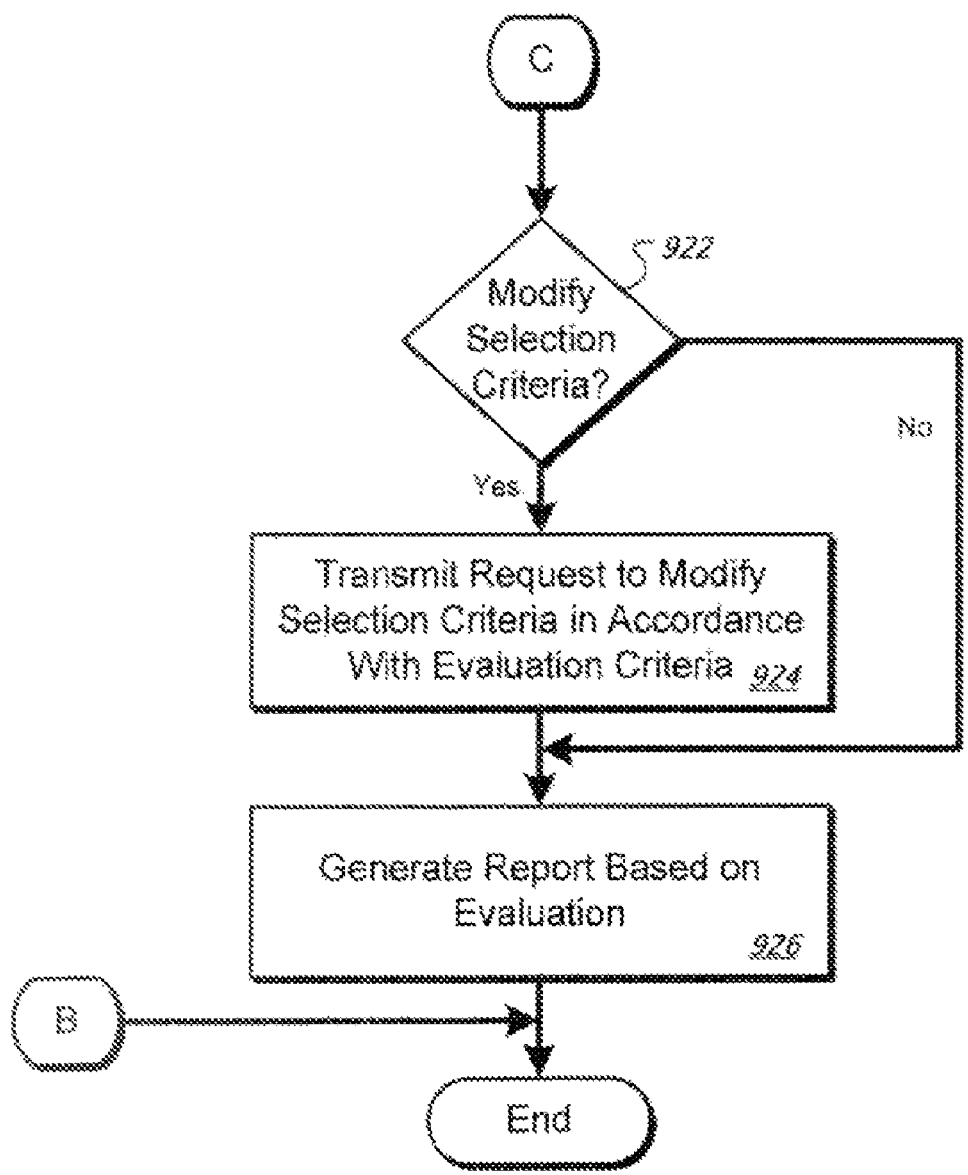

FIG. 9 is a flowchart illustrating an example method 900 for tracking actions associated with advertisements embedded in Web pages in accordance with some implementations of the present disclosure. Generally, method 900 describes an example technique where advertisements are selected for embedding in Web pages in accordance with selection criteria. System 400 contemplates using any appropriate combination and arrangement of logical elements implementing some or all of the described functionality.

Method 900 begins at step 902 where a DNS lookup request is received. For example, DNS server 402 may receive a DNS lookup request transmitted by the local DNS resolver 410. In the case that the request is transmitted using UDP, DNS sever 202 receives a single packet identifying a domain name. At step 904, a domain name is identified based, at least in part, on DNS lookup request. As for the example, DNS engine 426 identifies a domain name using a DNS lookup request. At step 906, information identifying actions associated with an advertisement is identified using the domain name. In the example, DNS engine 426 identifies a portion of the domain name including information associated with actions (e.g., click through). Next, a portion of the identified domain name is translated to an IP address at step 908. Again turning to the example, the DNS engine 426 identifies a translation file 416 associated with at least a portion of the domain name and translates the portion of the domain name using the translation file 416. In some implementations, the DNS engine 426 translates a portion of the domain name to an IP address. In some implementations the DNS engine 426 translates a portion of the domain name to a different domain name and an IP address. At step 910, the DNS engine 426 transmits a DNS lookup response including the translated portion. In the CNAME example, the DNS engine 426 generates a response including the CNAME in the "Answer Section" and the IP address in the "Additional Section."

If an event has not occurred at decisional step 912, then, at step 914, the action information is stored. Continuing with the example, the evaluation engine 428 may determine whether an event has occurred such as an expiration of a period of time. In the case that the event has not occurred, DNS engine 426 stores the action information in an associated log file 418. If the an event has occurred at decisional step 912, then, at step 916, criteria for evaluating actions associated with the advertisements is identified. In the example, the evaluation engine 428 identifies one or more evaluation criteria 420 in response to an event (e.g., period of time, number of request, number transmitted by content provider 104). At step 918, files including information associated with actions are identified. As for the example, the evaluation engine 428 identifies one or more log files 418 associated with the event. In some cases, the evaluation engine 428 identifies one or more log files 418 associated with a specific advertisement 120. Next, the actions associated with the advertisement are evaluated using the evaluation criteria at step 920. In the example, the evaluation engine 428 evaluates the actions associated with the link 116 using the identified log files 418. As mentioned above, the evaluation engine 428 may use mathematical expressions include in the evaluation criteria 420 to perform at least a portion of the evaluation (e.g., action rates). In the event that criteria for selecting an advertisement will be modified at decisional step 922, then, at step 924, a request to modify the selection criteria is transmitted to the appropriate ad server in accordance with the evaluation criteria. Turning to the example, the evaluation engine 428 may determine that the actions satisfy a threshold and in response transmit a request to the content provider 104 to modify selection criteria 122 associated with the advertisement. At step 926, a report including information associated with the evaluation is generated. As for the example, the evaluation engine 428 generates one or more evaluation reports 422 based, at least in part, on the evaluation Although this disclosure has been described in terms of certain implementations and generally associated methods, alterations and permutations of these implementations and methods will be apparent to those skilled in the art.

What is claimed is:
1. A method, comprising:
  receiving, in a Domain Name System (DNS), a DNS lookup request to resolve a hostname, the hostname including information associated with an action performed by a user in relationship to a link displayed through a Web browser, the information encoded into a hostname, wherein the information includes an action identifier specifying the action;
  identifying, by one or more processors of the DNS, the action specified by the action identifier encoded in the hostname to be resolved by the DNS lookup;
  as part of the DNS lookup, storing the identified action;

mapping the hostname to a Canonical Name (CNAME) using the DNS, the CNAME identifying a third-party server; and
resolving the hostname to the third-party server using the DNS.

2. The method of claim 1, the link comprising an image for presenting an advertisement.

3. The method of claim 1, further comprising:
receiving a search request to identify one or more Web sites based, at least in part, on search criteria; and
transmitting a Web page including the link operable to identify a Web site in accordance with the search request, the link comprising a hyperlink to the Web site.

4. The method of claim 1, the link comprising a hyperlink operable to direct the user to a third-party Web site.

5. The method of claim 1, wherein storing the identified action comprises:
storing information associated with the identified action and the link.

6. The method of claim 1, wherein the received information is configured in a single User Datagram Protocol (UDP) data packet.

7. The method of claim 1, the received information comprising initial information, the method further comprising:
receiving additional information associated with subsequent actions performed by the user or by other users in response to viewing the link; and
evaluating the link, including calculating an action rate in association with the link, using the initial information and the additional information in response to an event, the event defined by one or more evaluation criteria.

8. The method of claim 7, further comprising modifying guidelines for using the link in response to at least the evaluation.

9. The method of claim 7, further comprising modifying guidelines for presenting attributes of the link in response to at least the evaluation.

10. The method of claim 1, wherein the hostname is operable to identify the identified action.

11. The method of claim 10, the hostname further operable to identify a specific instance of the link.

12. The method of claim 10, further comprising:
mapping the hostname to an Internet Protocol (IP) address using the DNS; and
transmitting a response including the IP address to the user.

13. The method of claim 1, further comprising:
mapping the hostname to an Internet Protocol (IP) address using the DNS; and
transmitting both the CNAME and the IP address to the user.

14. The method of claim 1, wherein the hostname is unique for a period of time.

15. The method of claim 1, wherein the information further includes a content identifier.

16. A computer program product comprising computer readable instructions stored on non-transitory media and operable to cause one or more processors to perform operations comprising:
receiving, in a Domain Name System (DNS), information associated with an action performed by a user in relationship to a link displayed through a Web browser, the information encoded into a hostname, wherein the information includes an action identifier specifying the action;
resolving the hostname using a DNS lookup, the resolving including, as part of the DNS lookup, identifying the action specified by the action identifier encoded in the hostname to be resolved by the DNS lookup; and
as part of the DNS lookup, storing the identified action;
mapping the hostname to a Canonical Name (CNAME) using the DNS, the CNAME identifying a third-party server; and
resolving the hostname to the third-party server using the DNS.

17. The product of claim 16, wherein the host name is unique for a period of time.

18. The product of claim 16, wherein the information further includes a content identifier.

19. The product of claim 16, the operations further comprising:
storing information associated with the identified action and the link.

20. The product of claim 16, the received information comprising initial information, the operations further comprising:
receiving additional information associated with subsequent actions performed by the user or by other users in response to viewing the link; and
evaluating the link using the initial information and the additional information in response to an event, including calculating an action rate in association with the link, the action rate including a click through rate.

21. The product of claim 20, the operations further comprising modifying guidelines for using the link in response to at least the evaluation.

22. The product of claim 16, wherein the hostname is operable to identify the identified action.

23. The product of claim 16, the operations further comprising:
receiving a search request to identify one or more Web sites based, at least in part, on search criteria; and
transmitting a Web page including the link operable to identify a Web site in accordance with the search request, the link comprising a hyperlink to the Web site.

24. The product of claim 16, wherein storing the identified action comprises:
storing information associated with the action and the link.

25. The product of claim 16, wherein the hostname is included in a single User Datagram Protocol (UDP) data packet.

26. A server comprising one or more processors, the processors executing programming code stored in a medium, the processors configured to perform operations comprising:
receiving, in a Domain Name System (DNS), a DNS lookup request to resolve a hostname, the hostname including information associated with an action performed by a user in relationship to a link displayed through a Web browser, the information encoded into a hostname, wherein the information includes an action identifier specifying the action;
identifying, by the DNS, the action specified by the action identifier encoded in the hostname to be resolved by the DNS lookup;
as part of the DNS lookup, storing the identified action;
mapping the hostname to a Canonical Name (CNAME) using the DNS, the CNAME identifying a third-party server; and
resolving the hostname to the third-party server using the DNS.

27. The server of claim 26, wherein the hostname is unique for a period of time.

28. The server of claim 26, wherein storing the identified action comprises:

storing information associated with the one or more actions and the link.

29. The server of claim 26, the received information comprising initial information, the operations further comprising:
receiving additional information associated with subsequent actions performed by the user or other users in response to viewing the link; and
evaluating the link using the initial information and the additional information in response to an event, including calculating an action rate in association with the link, the action rate including a click through rate.

30. The server of claim 29, the operations further comprising modifying guidelines for using the link in response to at least the evaluation.

31. The server of claim 29, wherein the hostname is operable to identify the identified action.

32. The server of claim 26, the operations further comprising:
receiving a search request to identify one or more Web sites based, at least in part, on search criteria; and
transmitting a Web page including the link operable to identify a Web site in accordance with the search request, the link comprising a hyperlink to the Web site.

33. The server of claim 26, wherein the hostname is included in a single User Datagram Protocol (UDP) data packet.

34. The server of claim 26, wherein the received information further includes a content identifier.

35. A system for recording information, comprising:
means for receiving a Domain Name System (DNS) lookup request to resolve a hostname, the hostname including information associated with an action performed by a user in relationship to a link displayed through a Web browser, the information encoded into a hostname, wherein the information includes an action identifier specifying the action;
means for identifying the action specified by the action identifier encoded in the hostname to be resolved by the DNS lookup;
means for storing, as part of the DNS lookup, the identified action;
means for mapping the hostname to a Canonical Name (CNAME) using the DNS, the CNAME identifying a third-party server; and
means for resolving the hostname to the third-party server using the system.

36. A method, comprising:
receiving, in a Domain Name System (DNS), a DNS lookup request to resolve a hostname, the hostname including information associated with an action performed by a user in relationship to a link displayed through a Web browser, the information encoded into a hostname, wherein the information includes an action identifier specifying the action;
identifying, by one or more processors of the DNS, the action specified by the action identifier encoded in the hostname to be resolved by the DNS lookup;
as part of the DNS lookup, evaluating the identified action;
mapping the hostname to a Canonical Name (CNAME) using the DNS, the CNAME identifying a third-party server; and
resolving the hostname to the third-party server using the DNS.

37. The method of claim 36, further comprising:
receiving a search request to identify one or more Web sites based, at least in part, on search criteria; and
transmitting a Web page including the link operable to identify a Web site in accordance with the search request, the link comprising a hyperlink to the Web site.

38. The method of claim 37, further comprising:
mapping the hostname to an Internet Protocol (IP) address using the DNS; and
transmitting both the CNAME and the IP address to the user.

\* \* \* \* \*

UNITED STATES PATENT AND TRADEMARK OFFICE
CERTIFICATE OF CORRECTION

| | | |
|---|---|---|
| PATENT NO. | : 7,970,891 B1 | Page 1 of 1 |
| APPLICATION NO. | : 11/624129 | |
| DATED | : June 28, 2011 | |
| INVENTOR(S) | : Leonidas Kontothanssis et al. | |

It is certified that error appears in the above-identified patent and that said Letters Patent is hereby corrected as shown below:

Column 24, Line 2, Claim 16, after "lookup" delete "and"

Signed and Sealed this
Ninth Day of August, 2011

David J. Kappos
*Director of the United States Patent and Trademark Office*